(12) United States Patent
Jang et al.

(10) Patent No.: US 11,573,675 B2
(45) Date of Patent: Feb. 7, 2023

(54) GENERATING VISUAL EXPERIENCE-JOURNEY TIMELINES USING EXPERIENCE AND TOUCHPOINT DATA

(71) Applicant: Qualtrics, LLC, Provo, UT (US)

(72) Inventors: Myung Ryul Jang, Renton, WA (US);
Sachin Patney, Sammamish, WA (US);
Sharath Udupa, Seattle, WA (US)

(73) Assignee: Qualtrics, LLC, Provo, UT (US)

( * ) Notice: Subject to any disclaimer, the term of this patent is extended or adjusted under 35 U.S.C. 154(b) by 195 days.

(21) Appl. No.: 16/811,921

(22) Filed: Mar. 6, 2020

(65) Prior Publication Data
US 2021/0278953 A1    Sep. 9, 2021

(51) Int. Cl.
*G06F 9/451* (2018.01)
*G06Q 30/02* (2012.01)
*G06F 3/04812* (2022.01)
*G06T 11/20* (2006.01)

(52) U.S. Cl.
CPC .......... *G06F 3/04812* (2013.01); *G06F 9/451* (2018.02); *G06Q 30/0203* (2013.01); *G06T 11/206* (2013.01)

(58) Field of Classification Search
CPC .. G06F 3/04812; G06F 9/451; G06F 3/04817; G06Q 30/0203; G06T 11/206
See application file for complete search history.

(56) References Cited

U.S. PATENT DOCUMENTS

| | | | | |
|---|---|---|---|---|
| 9,858,244 | B1 * | 1/2018 | Bjorkegren | G06F 17/11 |
| 2008/0033779 | A1 * | 2/2008 | Coffman | G06Q 10/109 |
| | | | | 705/7.18 |
| 2012/0072311 | A1 * | 3/2012 | Khan | G06Q 30/0635 |
| | | | | 705/26.81 |
| 2014/0006938 | A1 * | 1/2014 | Black | G06T 13/00 |
| | | | | 715/255 |
| 2016/0147946 | A1 * | 5/2016 | Von Reden | G16H 10/60 |
| | | | | 705/3 |
| 2019/0347668 | A1 * | 11/2019 | Williams | H04L 67/2833 |

OTHER PUBLICATIONS

Pointillist: Discover and Optimize Your Customers' Journeys; Date downloaded Apr. 23, 2020; https://www.pointillist.com.

(Continued)

*Primary Examiner* — Jennifer N Welch
*Assistant Examiner* — Amy P Hoang
(74) *Attorney, Agent, or Firm* — Keller Preece

(57) ABSTRACT

This disclosure relates to methods, non-transitory computer readable media, and systems that generate experience-journey timelines that map touchpoints along a journey to experience data representing experiences of an entity at such touchpoints. Specifically, the disclosed systems can identify touchpoints and experience data indicating experiences of a user, organization, or other entity. Subsequently, the disclosed systems can map experience data to the touchpoints corresponding to the entity. Using such mappings, the disclosed systems can generate experience journey timelines that indicate mappings between particular experience indicators and particular touchpoints. Additionally, the disclosed systems can provide experience-journey timelines for display in graphical user interfaces and facilitate functionalities to explore data underlying the experience indicators at each touchpoint in the experience-journey timelines.

20 Claims, 18 Drawing Sheets

(56) References Cited

OTHER PUBLICATIONS

ENGAGEcx Digitizes your Destination; Date downloaded Apr. 23, 2020 https://developer.cisco.com/ecosystem/meraki/apps/5ae0dbb71df81277db9687a8/.
Usermind: Deliver experiences customers love; Date downloaded Apr. 23, 2020; https://www.usermind.com.
Verint; Date downloaded Apr. 23, 2020; https://www.verint.com.
Adobe Experience Cloud; Date downloaded Apr. 23, 2020; https://www.adobe.com/experience-cloud.html?promoid=Z9X3FR9C&mv=other.
BryterCX: Illuminate customer experience; Date downloaded Apr. 23, 2020 https://www.brytercx.com.
Teradata: Modern Cloud Architecture Analytics, Data Lakes and Data Warehouses Unified in the Cloud; Date downloaded Apr. 23, 2020; https://www.teradata.com.
Thunderhead: Our Product—Thunderhead orchestrates journeys that create individualized and engaging experiences. Date downloaded May 14, 2020; https://www.thunderhead.com/our-product/.
NICE: In Times of Change, NICE is here to help; Date downloaded Apr. 23, 2020; https://www.nice.com.
Kitewheel: The State of the Customer Journey 2020; Date downloaded Apr. 23, 2020; https://kitewheel.com.

* cited by examiner

2

GENERATING VISUAL EXPERIENCE-JOURNEY TIMELINES USING EXPERIENCE AND TOUCHPOINT DATA

BACKGROUND

In recent years, conventional analytics systems have increasingly analyzed data from organizations (and individuals) and applied analytical tools to present insights from such data into their operations or user base. Indeed, conventional analytics systems often provide user interfaces to display statistical information related to an organization's operations or user base. Although conventional analytics systems can determine and display statistical information for organizations or individuals, they have a number of technical shortcomings, such as user interfaces that inefficiently present insights and tools corresponding to the such information and that rigidly limit visualizations of data to one or a few dimensions.

For instance, conventional analytics systems often provide user interfaces that inefficiently present statistical information without significance or impact. In some cases, conventional analytics systems collect survey responses from respondents and present such survey results organized according to individual respondents. In addition to respondent-by-respondent organization, some conventional analytics systems present summaries of collective responses or statistics of survey responses, where both the summaries and statistics are organized by survey question. By presenting survey results per respondent or per question, conventional analytics systems often require users to navigate across multiple user interfaces— respondent by respondent or question by question—to review survey results.

In contrast to respondent-by-respondent or question-by-question summaries, some conventional analytics systems present stages (or actions) taken between or among different computing devices. In some cases, conventional analytics systems track user responses across activities and present the type of actions most frequently taken on different types of computing devices. Although presenting the type of actions most frequently taken on different types of computing devices can capture a user's activities in different locations or circumstances, conventional analytics systems that present such information often limit presenting such information to cross-device-activity paths and isolate such cross-device activity from other survey information significant to an organization collecting user responses.

When presenting survey results on a per-respondent or per-question basis or presenting actions taken on types of devices, conventional analytics systems often fail to provide easily accessible functionalities or options related to such survey results. By organizing survey results on a per-respondent or per-question basis, for instance, some conventional analytics systems limit functions or options to specific actions for a particular respondent or question, such as an option to contact a respondent or visualize data for a particular question. By presenting a user's or a group of user's actions taken across computing devices, some conventional analytics systems limit data to visualizing device type without further functions relevant to the user or group of users. Because such conventional analytics systems isolate survey results or actions to specific respondents, questions, or device types, such systems often provide user interfaces that require further and cumbersome navigation to locate a corresponding function (if one exists) or access data related to survey results— requiring additional computing resources and are inefficient.

SUMMARY

This disclosure describes one or more embodiments of systems, computer-readable media, methods, and computing devices that solve the foregoing problems and provide other benefits. In particular, the disclosed systems can generate experience-journey timelines that map touchpoints along a journey to experience data representing experiences of a user or other entity at such touchpoints. For instance, the disclosed systems can identify touchpoints and experience data indicating experiences of a user, segment of users, organization, or other entity. The disclosed systems can subsequently map the experience data to the touchpoints corresponding to the entity. Based on such mappings, the disclosed systems can generate an experience-journey timeline indicating mappings between particular experience indicators and particular touchpoints. By providing the experience-journey timeline in a graphical user interface, the disclosed systems can further provide options and functionalities to explore data underlying the experience indicators at each touchpoint.

BRIEF DESCRIPTION OF THE DRAWINGS

The detailed description is described with reference to the accompanying drawings in which.

DETAILED DESCRIPTION

Figure 1:
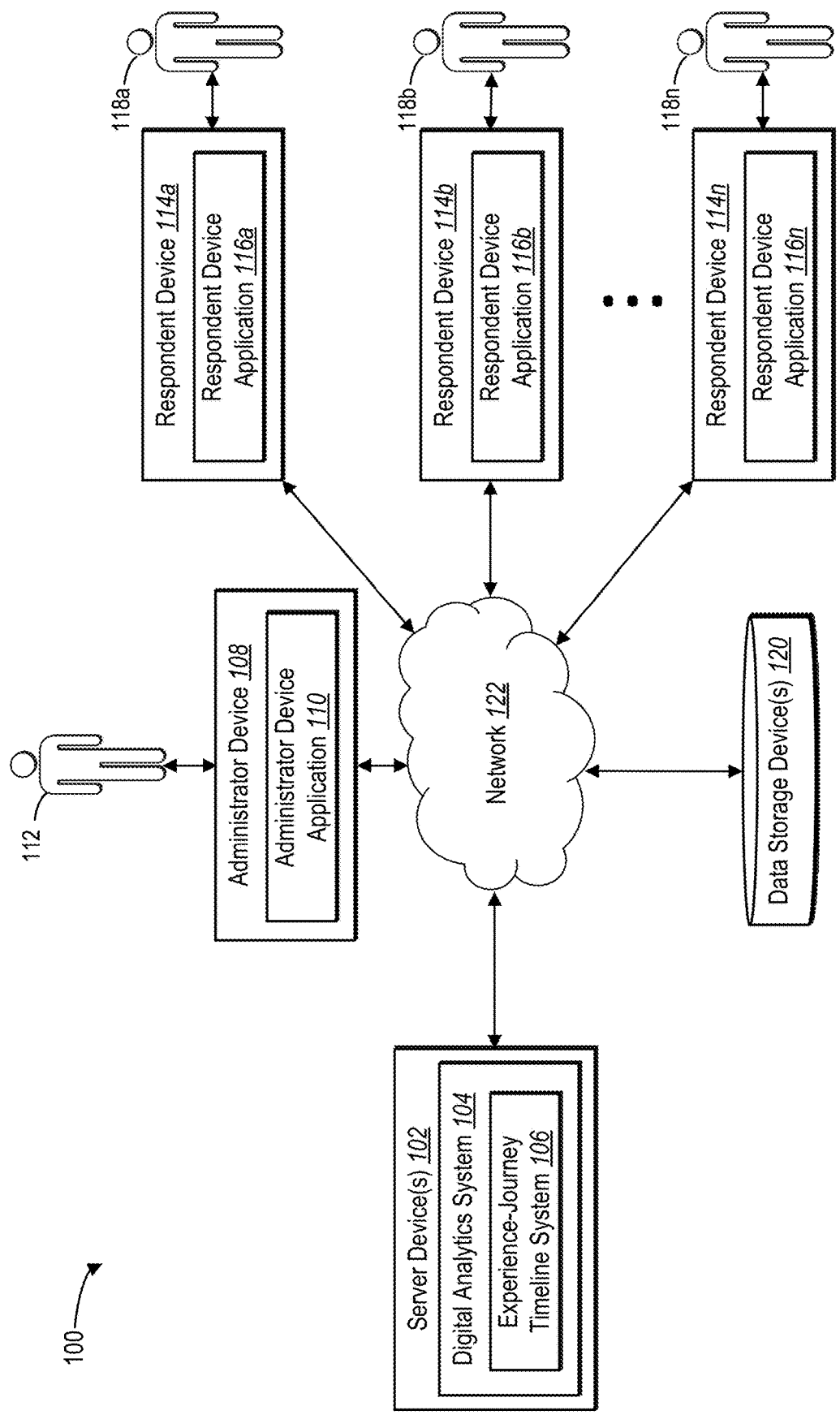
FIG. 1 illustrates a block diagram of an environment in which an experience-journey-timeline system can operate in accordance with one or more embodiments.

This disclosure describes one or more embodiments of an experience-journey-timeline system that can generate experience-journey timelines that map touchpoints along a journey to experience data representing experiences of a user or other entity at such touchpoints. For example, the experience-journey-timeline system can identify both touchpoints and experience data for an organization, person, segment of users, or other entity. Such experience data may reflect survey responses corresponding to different points along a journey or progression. Using the touchpoints and experience data, the experience-journey-timeline system maps experience data from the entity to the touchpoints along a journey for the entity.

Based on such mappings, the experience-journey-timeline system generates an experience-journey timeline indicating mappings between particular experience indicators and particular touchpoints for the entity. Such an experience-journey timeline can, for example, represent the sentiment of collective survey responses along touchpoints of a journey or progression for one or multiple respondents. By providing the experience-journey timeline in a graphical user interface, the experience-journey-timeline system can provide options and functionalities to explore data underlying the experience indicators at each touchpoint. The experience-journey-timeline system can accordingly generate improved user interfaces that efficiently and easily provide meaningful insights and tools for experience data along timelines.

As just mentioned, the experience-journey-timeline system can identify touchpoint data and experience data. For instance, in some embodiments, the experience-journey-timeline system can receive touchpoint data from an organization. Such touchpoint data can include interactions of an organization or other entity at one or more touchpoints corresponding to the organization. The experience-journey-timeline system can also receive experience data from a computing device of the entity. For instance, in some embodiments, the experience data includes survey responses collected by the experience-journey-timeline system via digital surveys.

Upon capturing experience data, the experience-journey-timeline system can map the experience data to the touchpoints corresponding to the entity. For example, in some embodiments, the experience-journey-timeline system uses metadata corresponding to the experience data (e.g., metadata corresponding to survey responses) to identify a relevant touchpoint for mapping the experience data. The experience-journey-timeline system can subsequently map the experience data to the determined touchpoint. Indeed, the experience-journey-timeline system can map various combinations and any number of experiences (using experience data) to one or more touchpoints corresponding to an organization or other entity. Moreover, the experience-journey-timeline system can also map the experience data of multiple users (or entities) to the one or more touchpoints corresponding to an organization.

Based on mappings between experience data and touchpoints corresponding to the organization, the experience-journey-timeline system generates an experience journey timeline. In particular, the experience-journey-timeline system can evaluate experience data mapped to a touchpoint to generate an experience indicator for the touchpoint. In some embodiments, the experience-journey-timeline system also associates a visual attribute with the experience indicator. Using generated experience indicators that individually correspond to several touchpoints, the experience-journey-timeline system can generate an experience-journey timeline that depicts a journey for the entity (across touchpoints) while also depicting the experience indicators in connection to the touchpoints. Indeed, the experience-journey-timeline system can provide or display the experience-journey timeline within a graphical user interface and provide interactive tools and functionalities corresponding to the experience-journey timeline.

To illustrate, in some cases, the experience-journey-timeline system receives touchpoint data from computing devices for airline customers (i.e., entities) that interact with an airline company (i.e., an organizational entity). Such touchpoint data indicates when airline customers interact with touchpoints, such as a check in, security, boarding, in-flight, destination, or baggage claim event. In certain embodiments, the experience-journey-timeline system also identifies experience data for the airline customers, such as survey responses from the airline customers. Subsequently, the experience-journey-timeline maps the survey responses corresponding to the airline customers to the touchpoints of the airline company. Upon mapping the survey responses to the touchpoints of the airline company, the experience-journey-timeline can evaluate the survey responses for individual touchpoints and generate experience indicators in a measurable representation of an experience for the individual touchpoints. As suggested above, the experience-journey-timeline system generates an experience-journey timeline that depicts the experiences of airline customers at each touchpoint in the journey using the experience indicators. For example, the experience-journey timeline may depict that the airline customers have a positive experience during an in-flight touchpoint and a negative experience during a baggage-claim touchpoint.

As suggested above, the experience-journey-timeline system overcomes several technical deficiencies that hinder conventional systems by providing user interfaces and tools that efficiently and easily display experience-journey timelines. For instance, in some embodiments, the experience-journey-timeline system improves the efficiency of conventional analytics user interfaces by integrating experience indicators along touchpoints of an experience-journey timeline to provide an efficient snapshot of experience data in a consolidated user interface. In contrast to user interfaces that present survey results on a per-respondent or per-question basis or present actions taken on types of devices, the experience-journey timeline system can consolidate experience data for multiple users or entities along touchpoints of an experience-journey timeline. Such an experience-journey timeline efficiently presents insights and improves both computing and user efficiency by reducing the frequency of accessing, storing, and presenting data across multiple user interfaces. The consolidated user interface further reduces user navigation to access experience data or other information along an experience journey timeline.

In addition to improved navigation and efficiency, the experience-journey-timeline system also generates user interfaces that efficiently provide options and functionalities related to the experience-journey timeline in a user-friendly format. As mentioned above, some conventional analytics systems present survey results on a per-respondent or per-question basis or present actions taken on types of devices—without providing additional interactive tools for the information or with limited options for particular users or questions. Indeed, some conventional user interfaces include non-interactive elements representing actions taken by users on a variety of computing devices.

Unlike such conventional systems, the experience-journey-timeline system can provide interactive elements in a single user interface (or combination of user interfaces) that access functionalities or data related to the experience-journey timeline. Along with an experience-journey timeline, in some embodiments, the experience-journey-timeline system provides an option to distribute digital surveys to entities corresponding to a specific touchpoint. Based on detecting a user selection of an option to distribute digital surveys for a touchpoint selected by the user, the experience-journey-timeline system can automatically identify entities that correspond to the touchpoint and provide options to distribute digital surveys to those entities to gain further insight for experiences in relation to the selected touchpoint. Based on detecting a user interaction with a touchpoint within an experience-journey timeline, for instance, the experience-journey-timeline system can likewise provide possible actions related to the touchpoint, entity-provided recommendations, entity information for the entity, or statistical evaluations for the touchpoint corresponding to the touchpoint within a graphical user interface. The experience-journey-timeline system can accordingly provide functionalities and information with a reduction in steps from users and increased efficiency in computing resource utilization.

As illustrated by the foregoing discussion, the present disclosure utilizes a variety of terms to describe features and advantages of the experience-journey-timeline system. For instance, as used herein, the term "entity" refers to an individual, group of individuals, or an organization. In particular, an entity can refer to an individual, group of individuals, or organization that interacts with another individual or organization. As an example, an entity can include an individual (or user) that interacts with an organization (e.g., a business or institution). Indeed, an entity can include, but is not limited to, a user of a product (e.g., a software product or service), consumer, member of an organization, employee of an organization. An entity can likewise include a segment of users or other individuals.

Additionally, as used herein, the term "segment of users" refers to multiple individuals, multiple organizations, or multiple users whose activities or responses have been recorded. Such individuals or users may be part of a larger entity. In particular, a segment of users includes multiple individuals, multiple organizations, or multiple users who share one or more common characteristics. For example, a segment of users can include multiple individuals or organizations that belong to or possess one or more defined characteristics (e.g., demographics, entity types, memberships). Furthermore, a segment of users can include multiple individuals or organizations determined to be within an identified class by the experience-journey-timeline system (e.g., new customers, key contacts).

Moreover, as used herein, the term "experience data" refers to data representing an impression of, description of, rating for, or reaction to a subject. In particular, experience data includes a user's (or entity's) impression, description, rating, or reaction relating to an interaction with another entity or an event corresponding to the entity. For example, experience data can include an idea, feeling, reaction, or opinion from an entity directed towards another entity or an event corresponding to the entity. In some embodiments, experience data can include any of or various combinations of survey responses, feedback data, comments, tests, social media data, biometric data, purchases, or interactive actions provided by one or more entities in relation to another entity or an event corresponding to the entity.

As used herein, the term "experience indicator" refers to a measurable representation of an experience determined from experience data. In particular, an experience indicator includes a quantifiable or measurable state of an experience that is determined from experience data. For example, an experience indicator can include a text-based or numerical based value that represents various combinations of a sentiment, emotion, or feedback result (e.g., class vote result). Moreover, the experience-journey-timeline system can utilize an experience indicator to associate and display a visual attribute that demonstrates (or illustrates) various combinations of a sentiment, emotion, or feedback result (e.g., a class vote result).

Furthermore, as used herein, the term "visual attribute" can refer to a characteristic of an object's visual appearance in a digital interface or display. For example, a visual attribute can include, but is not limited to, various combinations of a color attribute, a shape attribute, a size attribute, or a texture attribute of a graphical object. As an example, an experience indicator can include a positive sentiment determined from experience data that is represented (or illustrated) as a blue circle with a diameter size corresponding to the size of experience data utilized to determine the positive sentiment (e.g., the visual attribute).

As further used herein, the term "touchpoint" refers to a point of interaction between an entity and another entity. In particular, a touchpoint includes an interaction, event, and/or encounter between an entity (e.g., a user) and another entity (e.g., an organization or institution). As an example, a touchpoint can include an interaction between an e-commerce user and an e-commerce website, such as interactions for a website access, specific page visit, an add to cart action, contacting customer support, checkout action, product return action. As another example, a touchpoint can include an interaction between a traveler and an airline company, such as interactions for check in, security, boarding, in-flight, destination, baggage claim. A touchpoint can also include an interaction between an employee and an employer, such as interactions for clocking in, contacting human resources, submitting a paid time off request, paycheck distribution, project completion.

As used herein, the term "experience-journey timeline" refers to a path of touchpoints with associated experience indicators for the touchpoints. In particular, an experience-journey timeline includes a mapping of interactions corresponding to an entity with experience indicators for the interactions along a timeline. For example, an experience-journey timeline can include a timeline of touchpoints for an entity with visual experience indicators representing the entity's experience at each touchpoint.

As used herein, the term "digital survey" refers to a digital communication that collects information concerning one or more respondents (e.g., entities) by capturing information from (or posing questions to) such respondents. For example, a digital survey can include a set of digital survey questions or content intended for distribution over a network by way of client devices and further intended to collect responses to the digital survey questions for generating survey results from the collected responses. A digital survey can include one or more digital survey questions and corresponding answer choices that accompany the given question. Accordingly, a digital survey may include digital survey content, such as elements that form a digital survey such as, but not limited to, digital survey questions, survey question formats, transmission formats, or information about a respondent.

As used herein, the term "touchpoint information" refers to various combinations of actions, transaction details, evaluations, or recommendations corresponding to a touchpoint.

In particular, touchpoint information includes various combinations of actions, transaction details, evaluations, or recommendations based on an experience indicator corresponding to a touchpoint. For example, touchpoint information can include a possible action(s) related to a touchpoint (e.g., modifying operations related to the touchpoint, distributing digital surveys for the touchpoints). Moreover, touchpoint information can include entity information for an entity (e.g., entity demographics related to the touchpoint) and/or entity-provided recommendations (e.g., recommendations and/or feedback provided by an entity (via a computing device) to improve interactions with a particular touchpoint). Additionally, touchpoint information can also include statistical evaluations (e.g., results of statistical and/or analytic calculations/observations corresponding to a touchpoint). Furthermore, touchpoint information can include transaction details such as a product SKU corresponding to a transaction and/or a transaction amount.

Turning now to the figures, FIG. 1 illustrates a block diagram of a system 100 (or environment) in which a digital analytics system 104 and an experience-journey-timeline system 106 operate in accordance with one or more embodiments. As illustrated in FIG. 1, the system 100 includes server device(s) 102, an administrator device 108, respondent devices 114a-114n, and data storage device(s) 120, where the server device(s) 102 include the digital analytics system 104. As shown in FIG. 1, the digital analytics system 104 comprises the experience-journey-timeline system 106. Each of the administrator device 108 and the respondent devices 114a-114n are associated with a type of user. An administrator 112 is associated with the administrator device 108 and uses the administrator device 108 to manage the creation and distribution of a digital survey or review experience-journey timelines. Respondents 118a-118n (e.g., entities) are respectively associated with the respondent devices 114a-114n and use the respondent devices 114a-114n to provide experience data (e.g., digital survey responses) and touchpoint data.

In some embodiments, the administrator device 108 and the respondent devices 114a-114n communicate with server device(s) 102 over a network 122. As described below, the server device(s) 102 can enable the various functions, features, processes, methods, and systems described herein using, for example, the experience-journey-timeline system 106. As shown in FIG. 1, the experience-journey-timeline system 106 comprises computer executable instructions that, when executed by a processor of the server device(s) 102, perform certain actions described below with reference to FIGS. 2-9. Additionally, or alternatively, in some embodiments, the server device(s) 102 coordinate with one or both of the administrator device 108 and the respondent devices 114a-114n to perform or provide the various functions, features, processes, methods, and systems described in more detail below. Although FIG. 1 illustrates a particular arrangement of the server device(s) 102, the administrator device 108, the respondent devices 114a-114n, the data storage device(s) 120, and the network 122, various additional arrangements are possible. For example, the server device(s) 102 and the digital analytics system 104 may directly communicate with the administrator device 108, bypassing the network 122.

Generally, the administrator device 108 and respondent devices 114a-114n may be any one of various types of client devices. For example, the administrator device 108 and respondent devices 114a-114n may be mobile devices (e.g., a smart phone, tablet), laptops, desktops, or any other type of computing devices, such as those described below with reference to FIG. 12. Additionally, the server device(s) 102 may include one or more computing devices, including those explained below with reference to FIG. 12. The server device(s) 102, the administrator device 108, and the respondent devices 114a-114n may communicate using any communication platforms and technologies suitable for transporting data and/or communication signals, including the examples described below with reference to FIG. 13.

To access the functionalities of the experience-journey-timeline system 106, in certain embodiments, the administrator 112 interacts with an administrator device application 110 on the administrator device 108. Similarly, to provide experience data (e.g., access digital surveys and compose survey responses) and to provide touchpoint data, or other functions of the digital analytics system 104, in some implementations, the respondents 118a-118n interact with respondent device applications 116a-116n, respectively. In some embodiments, one or both of the administrator device application 110 and the respondent device applications 116a-116n comprise web browsers, applets, or other software applications (e.g., native applications or web applications) available to the administrator device 108 or the respondent devices 114a-114n, respectively. Additionally, in some instances, the digital analytics system 104 provides data packets including instructions that, when executed by the administrator device 108 or the respondent devices 114a-114n, create or otherwise integrate the administrator device application 110 or the respondent device applications 116a-116n within an application or webpage for the administrator device 108 or the respondent devices 114a-114n, respectively.

As an initial overview, the server device(s) 102 provide the administrator device 108 access to the digital analytics system 104 and the experience-journey-timeline system 106 by way of the network 122. In one or more embodiments, by accessing the digital analytics system 104, the server device(s) 102 provide one or more user interfaces and/or data to the administrator device 108 to enable the administrator 112 to provide touchpoint data and/or experience data to the experience-journey-timeline system 106. For example, the digital analytics system 104 can include a website (e.g., one or more webpages) or utilize the administrator device application 110 to enable the administrator 112 to create digital surveys or other digital content for distribution to the respondent devices 114a-114n, configure touchpoint data, access experience-journey timelines, or other analytics tools corresponding to the experience-journey timelines.

In some cases, the administrator device 108 launches the administrator device application 110 to facilitate interacting with the digital analytics system 104 or its constituent experience-journey-timeline system 106. The administrator device application 110 may coordinate communications between the administrator device 108 and the server device(s) 102 that ultimately results in the creation of digital surveys, touchpoint data, experience journey timelines, analytic tools for use on the administrator device application 110. In addition, the administrator device application 110 may cause the administrator device 108 to present tools for creating other digital content that the digital analytics system 104 distributes to the administrator device (e.g., analytics tools, reports, user interfaces for experience journey timelines) or to the one or more of the respondent devices 114a-114n (e.g., digital surveys). For instance, to facilitate the creation of a digital survey or to display an experience journey timeline, the administrator device application 110 can provide graphical user interfaces of the digital analytics system 104, receive indications of interactions from the administrator 112 with the administrator device 108, and cause the administrator device 108 to communicate user input based on the detected interactions to the digital analytics system 104. For example, the administrator device application 110 can include instructions that (upon execution) cause the administrator device 108 to communicate graphical user interface interactions, touchpoint data configurations, experience data configurations, or analytics requests (e.g., experience journey timelines).

In some embodiments, the digital analytics system 104 (or its constituent experience-journey-timeline system 106), the administrator device 108, and/or the respondent devices 114a-114n communicate with the data storage device(s) 120 to store and access experience data and touchpoint data. For example, the administrator device 108 can communicate with respondent devices 114a-114n to obtain touchpoint data (e.g., via interactions or via a third party touchpoint system) and store such touchpoint data within the data storage device(s) 120. Moreover, the digital analytics system 104 can communicate with the respondent devices 114a-114n (or the administrator device 108) to obtain experience data (e.g., survey responses) and store such experience data within the data storage device(s) 120. Also, the experience-journey-timeline system 106 may access the data storage device(s) 120 to utilize touchpoint data and experience data in order create mappings between the data and generate experience-journey timelines.

As an overview of the experience-journey-timeline system 106, the respondent devices 114a-114n (e.g., associated with entities) interact with the administrator device 108 (e.g., associated with another entity, such as an organization or institution). From the interactions, the administrator device 108 (or some third party) identifies touchpoint data. Additionally, the digital analytics system 104 receives experience data (e.g., as a response for such experience data) from the respondent devices 114a-114n. Then, the experience-journey-timeline system 106 utilizes the touchpoint data and the experience data to generate experience-journey timelines corresponding to the respondents 118a-118n and their interactions with an organization (e.g., the administrator device 108). Such experience journey timelines are provided to the administrator device application 110 (within graphical user interfaces as analytics tools) by the experience-journey-timeline system 106.

Although FIG. 1 illustrates the experience-journey-timeline system 106 being implemented by a particular component and/or device (e.g., server device(s) 102) within the system 100, the experience-journey-timeline system 106 (and/or the digital analytics system 104) can be implemented, in whole or in part, by other computing devices and/or components in the system 100. For example, the experience-journey-timeline system 106 can be implemented in whole, or in part, by the administrator device 108. In particular, the experience-journey-timeline system 106 can operate on the administrator device 108 to generate experience-journey timelines using experience data and touchpoint data. Specifically, the administrator device 108 can include the experience-journey-timeline system 106 via the administrator device application 110.

Figure 2:
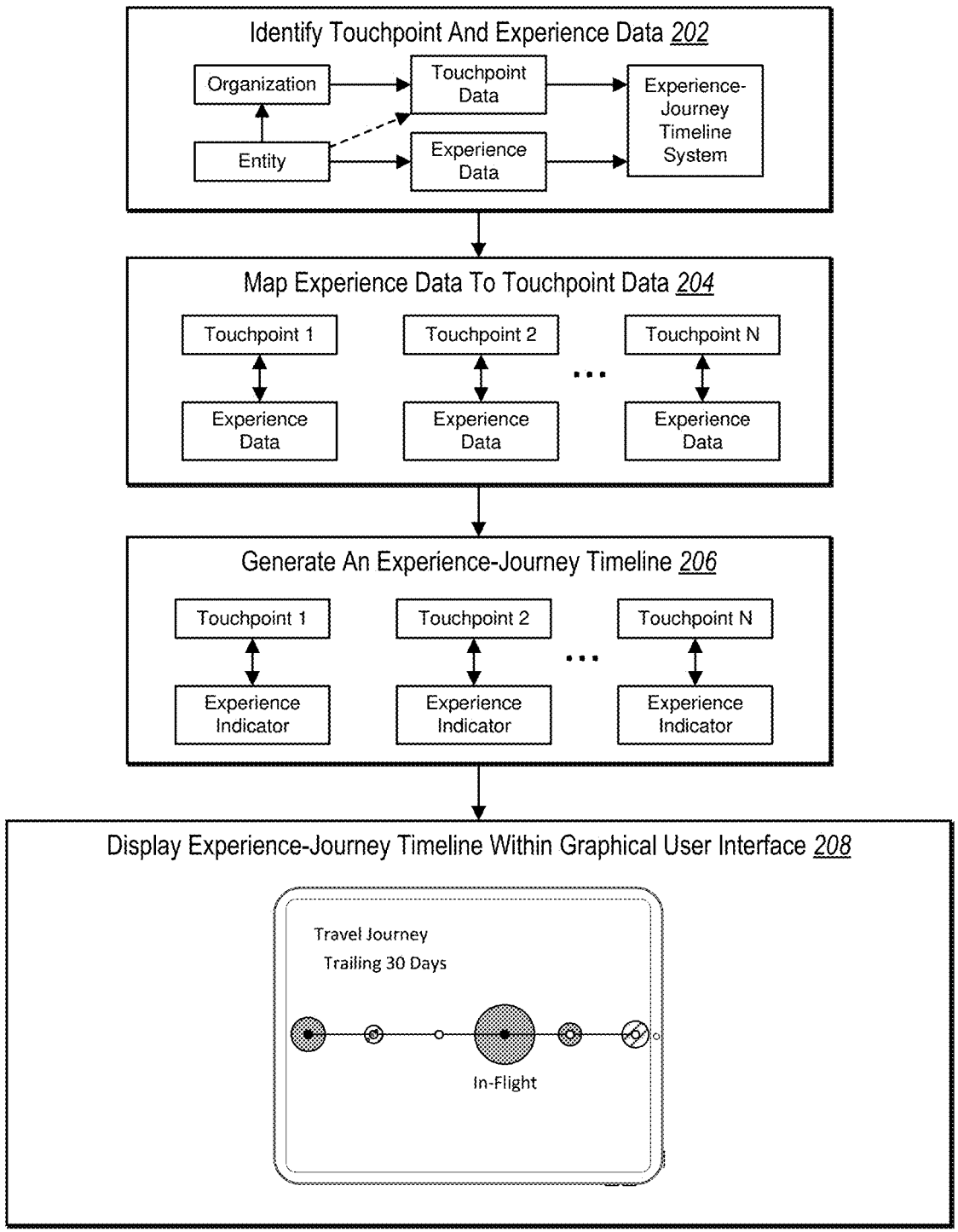
FIG. 2 illustrates an overview of an experience-journey-timeline system generating an experience-journey timeline for display in accordance with one or more embodiments.

As mentioned above, the experience-journey-timeline system 106 can generate graphical user interfaces comprising experience-journey timelines that provide comprehensive insights using a combination of touchpoint data and experience data. FIG. 2 provides a brief overview of one embodiment of the experience-journey-timeline system 106 generating and displaying an experience-journey timeline. In particular, FIG. 2 illustrates the experience-journey-timeline system 106 identifying touchpoint and experience data and mapping the experience data to the touchpoint point data. Moreover, FIG. 2 also illustrates the experience-journey-timeline system 106 generating an experience journey timeline and displaying a visual experience-journey timeline within a graphical user interface.

As shown in FIG. 2, the experience-journey-timeline system 106 identifies touchpoint and experience data in an act 202. In particular, one or more entities (e.g., users) can interact with an organization to create touchpoint data. Based on the entities' interactions, computing devices associated with such entities provide touchpoint data to the experience-journey-timeline system 106. Moreover, the experience-journey-timeline system 106 can also receive experience data from computing devices associated with the one or more entities that interact with the organization.

As an example of the act 202, the entities can include airline customers and the organization can include an airline company. Indeed, the airline customers can interact with the airline company in various ways to create touchpoint data (e.g., by checking in, going through security, boarding a flight, being in flight, departing from a plane, using baggage claim). Moreover, the experience-journey-timeline system 106 can collect experience data (e.g., via survey responses) from the airline customers. Additional detail regarding identifying touchpoint data and experience data is provided below (e.g., in relation to FIG. 3).

Subsequently, as illustrated in FIG. 2, the experience-journey-timeline system 106 maps the experience data to the touchpoint data in an act 204. In particular, the experience-journey-timeline system 106 can utilize information corresponding to the experience data (e.g., metadata) to determine a corresponding touchpoint. In addition, the experience-journey-timeline system 106 can map the experience data to a corresponding touchpoint. For instance, in the airline example, the experience-journey-timeline system 106 can map experience data from survey responses concerning in-flight services to an "in-flight" touchpoint. Additional detail regarding mapping experience data to touchpoint data is provided below (e.g., in relation to FIG. 4).

Furthermore, as shown in FIG. 2, the experience-journey-timeline system 106 generates an experience-journey timeline in an act 206. For instance, the experience-journey-timeline system 106 can analyze (or evaluate) a set of experience data that corresponds to a touchpoint to generate an experience indicator for the touchpoint. As an example, the experience-journey-timeline system 106 can analyze survey responses tagged with metadata for in-flight services to determine an experience indicator for an "in-flight" touchpoint (e.g., a positive or negative experience). Indeed, the experience-journey-timeline system 106 can determine experience indicators for any number of touchpoints and use the experience indicators in combination with the touchpoints to generate an experience journey timeline. Additional detail regarding generating an experience journey timeline and experience indicators is provided below (e.g., in relation to FIG. 5).

Finally, as shown in FIG. 2, the experience-journey-timeline system 106 can display an experience-journey timeline within a graphical user interface in an act 208. In particular, the experience-journey-timeline system 106 can provide the experience indicators for display as visual attributes in connection to touchpoints within an experience journey timeline. Moreover, the experience-journey-timeline system 106 can also provide touchpoint information and/or other functionalities related to the touchpoints using selectable elements within a graphical user interface for an experience journey timeline. As an example and as shown in FIG. 2, the experience-journey-timeline system 106 can provide an experience-journey timeline for display depicting touchpoints for airline customers, including a positive experience indicator during in-flight interactions (e.g., using a solid shade as opposed to a striped pattern to demonstrate a positive sentiment at an in-flight touchpoint within the experience-journey timeline). Additional detail regarding displaying experience-journey timelines within graphical user interfaces and providing additional functionalities for the experience-journey timelines is provided below (e.g., in relation to FIGS. 6A, 6B, 7A, 7B, 8A, 8B, 9A, 9B, and 9C).

As mentioned above, the experience-journey-timeline system 106 can identify touchpoint and experience data. In particular, the experience-journey-timeline system 106 can identify touchpoint data that indicates interactions between one or more entities (e.g., a user and an organization). Furthermore, the experience-journey-timeline system 106 can also identify experience data that indicates an entity experience in relation to an interaction between the entities (e.g., an experience between a user and an organization).

Figure 3:
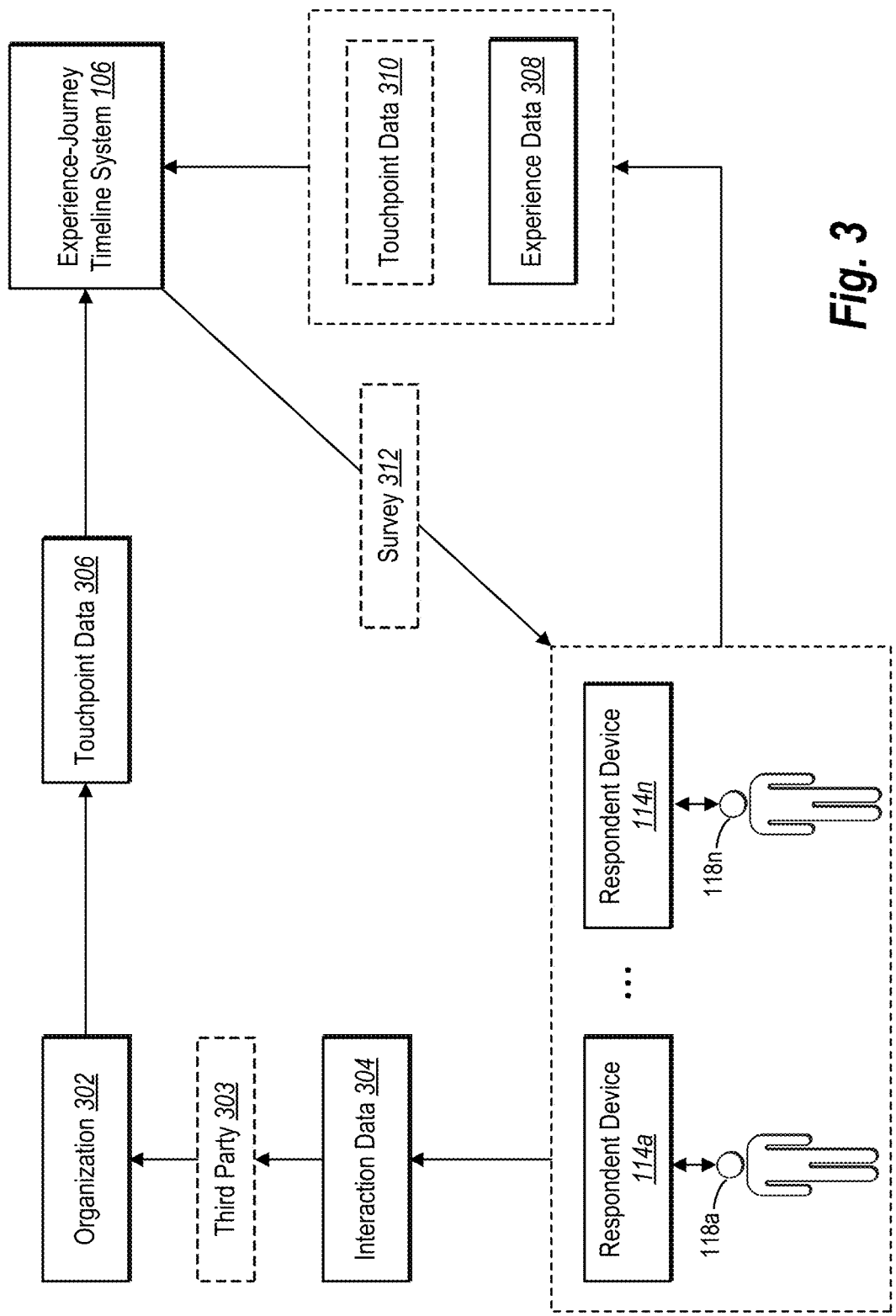
FIG. 3 illustrates a schematic diagram of an experience-journey-timeline system identifying experience data and touchpoint data in accordance with one or more embodiments.

For example, as shown in FIG. 3, the respondents 118a-118n (e.g., via respondent devices 114a-114n) provide interaction data 304 to an organization 302. Indeed, as further illustrated in FIG. 3, the organization 302 (via the administrator device 108) can utilize the interaction data 304 to determine touchpoints corresponding to the interactions and provide touchpoint data 306 to the experience-journey-timeline system 106. In some embodiments, as shown in FIG. 3, the interaction data 304 can be provided to a third party 303 (via a computing device) that can evaluate the interaction data 304 to determine touchpoints and provide the touchpoint data 306 to the experience-journey-timeline system 106.

Furthermore, as illustrated in FIG. 3, the respondents 118a-118n (e.g., via respondent devices 114a-114n) provide experience data 308 to the experience-journey-timeline system 106. Indeed, in some embodiments, the experience data 308 can be provided in response to a survey 312 distributed by the digital analytics system 104 or related digital survey system. Furthermore, in one or more embodiments, the respondents 118a-118n (e.g., via respondent devices 114a-114n) can provide touchpoint data 310 to the experience-journey-timeline system 106 (e.g., as part of metadata for the experience data 308).

As an example, in reference to FIG. 3, the respondents 118a-118n can represent entities that interact with the organization 302 (e.g., another entity). For instance, the respondents 118a-118n can be airline customers that interact with the organization 302 (e.g., an airline company). In particular, the interaction data 304 can include interactions such as, but not limited to, payments from a customer, scanning an identification of a customer, a customer communicating with an airline company employee. The airline company (e.g., the organization 302) can use this interaction data 304 to identify a touchpoint in which a customer interacts with the airline company. For instance, an airline company may identify touchpoints including a check in, security, boarding, in-flight, destination, and baggage claim event.

In some embodiments, the respondents 118a-118n (as airline customers) can provide the experience data 308 via the respondent devices 114a-114n in correspondence to the organization 302 (e.g., the airline company). In particular, the experience-journey-timeline system 106 can collect feedback, reviews, comments, and/or other information from airline customers that corresponds to the airline customers experience with the airline company. For example, the airline customers can provide survey responses to digital surveys (e.g., survey 312) corresponding to the airline company and interactions with the airline company as the experience data 308 (via computing devices corresponding to the airline customers).

In one or more embodiments, the experience-journey-timeline system 106 identifies (or collects) interaction data, touchpoint data, and/or experience data from one or more entities. In particular, as shown in FIG. 3, the one or more entities can include users that interact with another entity (e.g., an organization or institution). In some embodiments, the one or more entities can include organizations that interact with each other (e.g., a first organization, as a customer, provides touchpoint data and/or experience data in relation to second organization). Moreover, the entities can also include users that operate within an organization (e.g., employees). As an example, the entities can include employees of a company and can provide (via computing devices) the experience-journey-timeline system 106 with interaction data, touchpoint data, and/or experience data corresponding to an organization (e.g., an employer). Indeed, the entities can include various combinations of relations in which interaction data, touchpoint data, and/or experience data is provided (via computing devices) in relation to one or more of those entities.

Additionally, the experience-journey-timeline system 106 can identify an entity using one or more profiles corresponding to the entity. For instance, the experience-journey-timeline system 106 can identify interaction data, touchpoint data, and/or experience data from one or more user profiles (e.g., various different user profiles belonging to different platforms, organizations, communication accounts). The experience-journey-timeline system 106 can further determine that the one or more user profiles belong to a single entity and can associate the interaction data, touchpoint data, and/or experience data (corresponding to the one or more user profiles) with the single entity (e.g., as a user).

As an example, the experience-journey-timeline system 106 can identify touchpoint data via an airline-membership-user profile and experience data via an email-address-user profile. Furthermore, the experience-journey-timeline system 106 can determine that the airline-membership-user profile and the email-address-user profile belong to a single entity. Indeed, the experience-journey-timeline system 106 can associate the touchpoint data collected via the airline-membership-user profile and experience data collected via the email-address-user profile with the single entity.

Moreover, in one or more embodiments, the experience-journey-timeline system 106 can utilize various types of touchpoints. For instance, the experience-journey-timeline system 106 can identify a touchpoint based on a touchpoint definition from an entity (e.g., an organization, third party, or a user). In particular, the experience-journey-timeline system 106 can receive a defined touchpoint that corresponds to a specific interaction between entities (e.g., between a user and an organization) or within an entity's operation (e.g., from employees within an organization).

In some embodiments, the touchpoints correspond to specific interaction triggers. For example, the experience-journey-timeline system 106 can receive a touchpoint definition that associates specific interactions with a touchpoint. Then, for example, when an entity (e.g., a respondent or user) interacts with an organization, the organization, third party, and/or the experience-journey-timeline system 106 (in reference to FIG. 3) can determine that the entity has triggered a touchpoint based on the interaction data. As an example, an entity can scan their passport to request a boarding pass at an airport and the organization, third party, and/or the experience-journey-timeline system 106 can utilize such interaction data to determine that the entity is experiencing or triggered a "check-in" touchpoint.

Although one or more embodiments herein illustrate touchpoints in relation to an airline company, the experience-journey-timeline system 106 can utilize any variety of touchpoint data. For instance, the touchpoint data can include interactions that are specific to any variety of operation or organization. For example, the touchpoint data can include events that occur between employees of an organization, between employees and an employer, customers and an organization, product users and a product, customers and a service.

In some embodiments, the experience-journey-timeline system 106 can provide a set of predefined touchpoints for an organization. In particular, the experience-journey-timeline system 106 can provide analytics tools that correspond to a specific set of touchpoints (e.g., touchpoints that are predefined for an organization). Indeed, the experience-journey-timeline system 106 can provide a set of predefined touchpoints for an organization that are standardized for an industry. Indeed, the experience-journey-timeline system 106 (or the organization) can utilize interaction data from entities to determine a touchpoint from within the provided set of defined touchpoints as a triggered touchpoint for the entities.

Moreover, the experience-journey-timeline system 106 can utilize the predefined set of touchpoints and experience data from multiple individuals or organizations (across multiple organizations that utilize the predefined touchpoints) to determine industry benchmark experience indicators. Indeed, the experience-journey-timeline system 106 can utilize the industry benchmark experience indicators within an experience-journey timeline to indicate both an experience indicator for entities interacting with an organization at a touchpoint and industry benchmarks (across similar organizations) at the same touchpoint.

As an example, the experience-journey-timeline system 106 can provide a set of predefined touchpoints to multiple airline companies (e.g., a check in, security, boarding, in-flight, destination, and baggage claim event). Moreover, the experience-journey-timeline system 106 can utilize touchpoint data and experience data for entities interacting with each of the airline companies to determine experience indicators for each touchpoint for each individual airline company. Additionally, the experience-journey-timeline system 106 can also utilize the experience indicators belonging to each airline company at the standardized touchpoints to provide a benchmark experience indicator at the touchpoint (which accounts for all participating airline companies).

Furthermore, the experience-journey-timeline system 106 can also identify experience data from one or more entities. For example, as previously mentioned, experience data can include an idea, feeling, reaction, or opinion from an entity directed towards another entity or an event corresponding to the entity. For instance, experience data can include survey responses, reactions, feedback (e.g., social media reactions), and/or biometric data. Additionally, the experience-journey-timeline system 106 can identify experience data in various combinations of text, values, vote-based data (e.g., a like or a dislike on social media), and/or selections (e.g., selections in a multiple choice survey). Moreover, the experience data can also include actions taken by an entity. As an example, the experience-journey-timeline system 106 can identify actions such as purchases and/or enrollments into a service or program related to an organization as experience data.

Indeed, in some embodiments, the experience-journey-timeline system 106 requests experience data from an entity upon identifying a touchpoint event with the entity. For instance, the experience-journey-timeline system 106 (or an organization) can identify that an entity triggered a touchpoint. In response to identifying the triggered touchpoint, the experience-journey-timeline system 106 can request experience data from the entity. As an example, upon identifying that an airline customer triggered a "check-in" touchpoint, the experience-journey-timeline system 106 can identify experience data for the airline customer in relation to the check-in process (e.g., via survey responses, reactions, feedback, and/or biometric data).

In some embodiments, the experience-journey-timeline system 106 can identify experience data for entities via digital surveys. In particular, the experience-journey-timeline system 106 can provide one or more digital surveys and receive responses to the digital surveys as the experience data. As an example, the experience-journey-timeline system 106 can provide an airline customer with a digital survey related to the airline customer's experience with an airline company. Indeed, the experience-journey-timeline system 106 can utilize the airline customer's response to the digital survey as experience data.

As mentioned above, the experience-journey-timeline system 106 can map experience data to a touchpoint. For example, in some embodiments, the experience-journey-timeline system 106 can create a data model structure that includes mappings between experience data (for one or more entities) and touchpoint data. Indeed, the experience-journey-timeline system 106 can map various combinations of experience data to various touchpoints using various approaches (e.g., based on information corresponding to the experience data).

Figure 4:
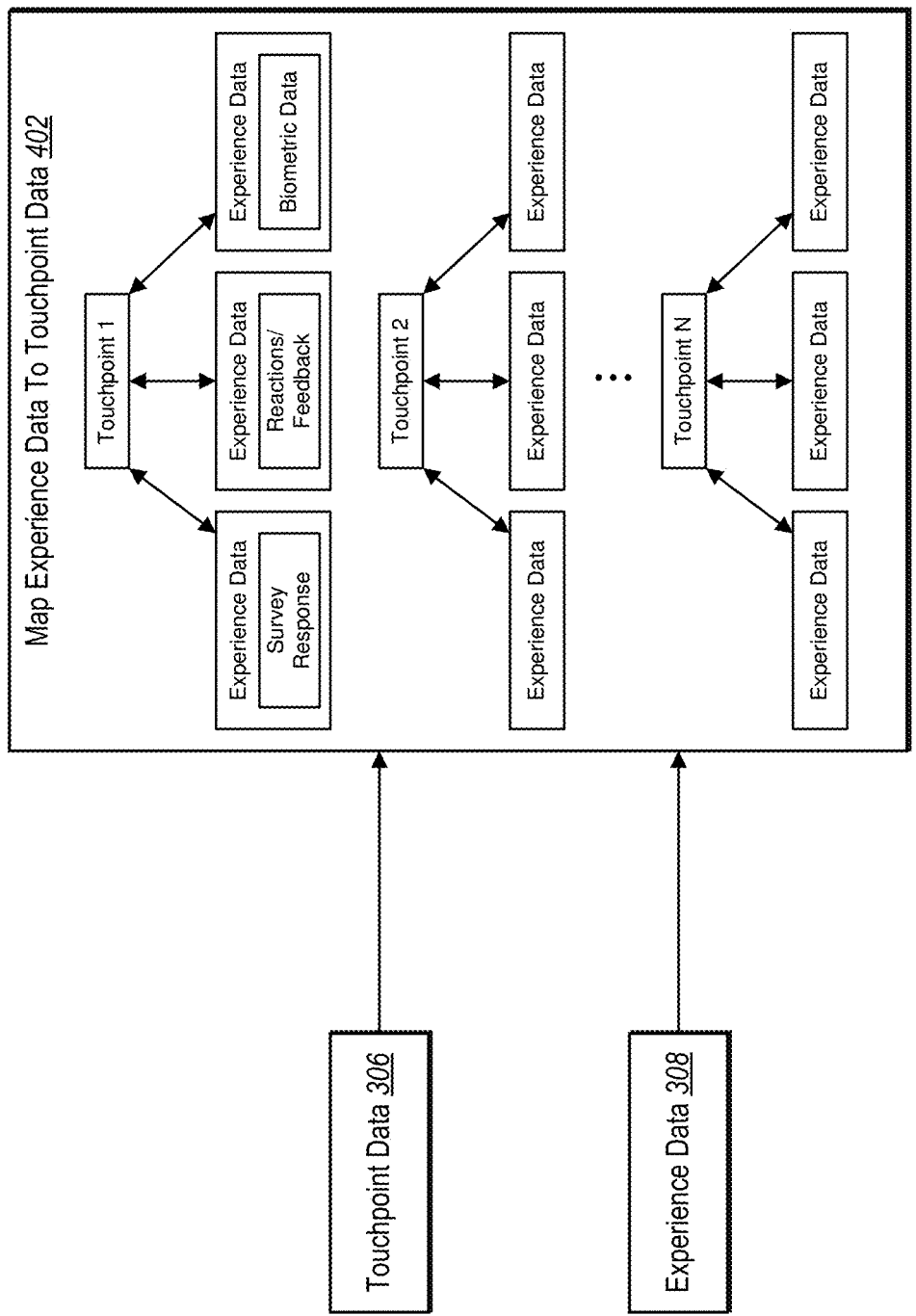
FIG. 4 illustrates a schematic diagram of an experience-journey-timeline system mapping experience data to touchpoint data in accordance with one or more embodiments.

In accordance with one or more embodiments, FIG. 4 illustrates the experience-journey-timeline system 106 mapping experience data to touchpoint data. In particular, as shown in FIG. 4, the experience-journey-timeline system 106 can utilize the touchpoint data 306 and the experience data 308 (e.g., identified as described in FIG. 3) to create a data model structure that includes mappings between experience data and touchpoints. Indeed, as illustrated in FIG. 4, the experience-journey-timeline system 106 maps the experience data 308 to the touchpoint data 306 in an act 402. Specifically, as shown in FIG. 4, the experience-journey-timeline system 106 maps particular experience data from the experience data 308 to particular touchpoints from the touchpoint data 306 (e.g., a set of touchpoints). As also shown in FIG. 4, the experience-journey-timeline system 106 (in the act 402) can map various types and amounts of experiences (e.g., survey responses, reactions, feedback, and/or biometric data) to different touchpoints (e.g., touchpoint 1, touchpoint 2, . . . , touchpoint N).

Furthermore, as an example in reference to FIG. 4, the touchpoint data 306 can include touchpoints corresponding to an airline company and the experience data 308 can include experiences identified from entities interacting with the airline company (e.g., airline customers interacting with the airline company). Then, the experience-journey-timeline system 106 (in the act 402) can map experiences from the experience data 308 for the airline customers to one or more touchpoints of the airline company (e.g., a digital survey response determined to correspond to a check-in process can be mapped to a "check-in" touchpoint).

In order to map experience data to one or more touchpoints, the experience-journey-timeline system 106 can utilize information corresponding to the experience data. In particular, the experience-journey-timeline system 106 can identify information corresponding with experience data (e.g., with a survey response, feedback). For instance, the information can include metadata or a tag corresponding to the experience data or content of the experience data. In some embodiments, the experience-journey-timeline system 106 can identify information corresponding to experience data that does not include metadata or tags (e.g., pre-existing survey responses that are analyzed after capture) in order to map the experience data to one or more touchpoints (e.g., by analyzing the content of the experience data).

Indeed, the experience-journey-timeline system 106 can utilize the metadata or tag corresponding with the experience data to determine a relevant touchpoint. For example, the experience-journey-timeline system 106 can determine that metadata or a tag for experience data includes information indicating an association with a touchpoint and can map the experience data to the touchpoint. For instance, the information can include a specific tag or rule-based indicator for a touchpoint (e.g., a code or label corresponding to a touchpoint). In some embodiments, the experience-journey-timeline system 106 can use metadata information such as, but not limited to, a geolocation, time, and/or date to determine a touchpoint for the experience data.

For instance, the experience-journey-timeline system 106 can include metadata and/or tags within a digital survey to indicate a specific touchpoint. Upon receiving a survey response for the digital survey, the experience-journey-timeline system 106 can map the survey response (as experience data) to the specific touchpoint identified in the metadata and/or tags. In one or more embodiments, the experience-journey-timeline system 106 can include metadata and/or tags for specific prompts (or questions) within a digital survey. For instance, the experience-journey-timeline system 106 can include metadata to indicate that a first portion of a digital survey corresponds to a first touchpoint and that a second portion of the digital survey corresponds to a second touchpoint. Indeed, the experience-journey-timeline system 106 can map a survey response corresponding to the first portion of the digital survey as experience data for the first touchpoint and can map a survey response corresponding to the second portion of the digital survey as experience data for the second touchpoint.

In one or more embodiments, the experience-journey-timeline system 106 analyzes the content of the experience data and determines a relevant touchpoint. As an example, upon receiving a text-based response or comment as experience data, the experience-journey-timeline system 106 can analyze the text-based response to determine a touchpoint. For instance, the experience-journey-timeline system 106 can determine that the experience data refers to a specific touchpoint and, thus, map the experience data to the specific touchpoint.

Moreover, the experience-journey-timeline system 106 can map a plurality of experience data to a touchpoint. For example, the experience-journey-timeline system 106 can map more than one experience data item (e.g., multiple experiences) to a single touchpoint. Indeed, the experience-journey-timeline system 106 can map multiple experiences for multiple touchpoints based on the determined mappings. Furthermore, the experience-journey-timeline system 106 can map the same experience data to more than one touchpoint when the experience data is determined to correspond to more than one touchpoint.

In addition, the experience-journey-timeline system 106 can map experience data associated with more than one entity to a touchpoint. In particular, the experience-journey-timeline system 106 can map experience data of multiple individuals, organizations, or users to a touchpoint. Furthermore, the experience-journey-timeline system 106 can tag or indicate entity associations for each experience mapped to a touchpoint (e.g., in order to facilitate filtering and displaying experience-journey timelines for a segment of users or specific users).

Furthermore, the experience-journey-timeline system 106 can map various combinations of experience data types to a touchpoint. In particular, the experience-journey-timeline system 106 can map different experience data types to a touchpoint. For example, as shown in FIG. 4, the experience-journey-timeline system 106 can map a survey response, social media feedback, and a biometric data to a touchpoint. Indeed, the experience-journey-timeline system 106 can determine that an experience of any type identified for an entity corresponds to a touchpoint and map the experience to the touchpoint.

As mentioned above, the experience-journey-timeline system 106 can determine experience indicators for touchpoints and experience-journey timelines. In particular, the experience-journey-timeline system 106 can utilize experience data mapped to a touchpoint to generate an experience indicator for the touchpoint. Indeed, the experience-journey-timeline system 106 can use mappings between experience data and each touchpoint to determine experience indicators for each of the touchpoints. The experience-journey-timeline system 106 can subsequently utilize the touchpoints with the corresponding experience indicators to generate an experience-journey timeline.

Figure 5:
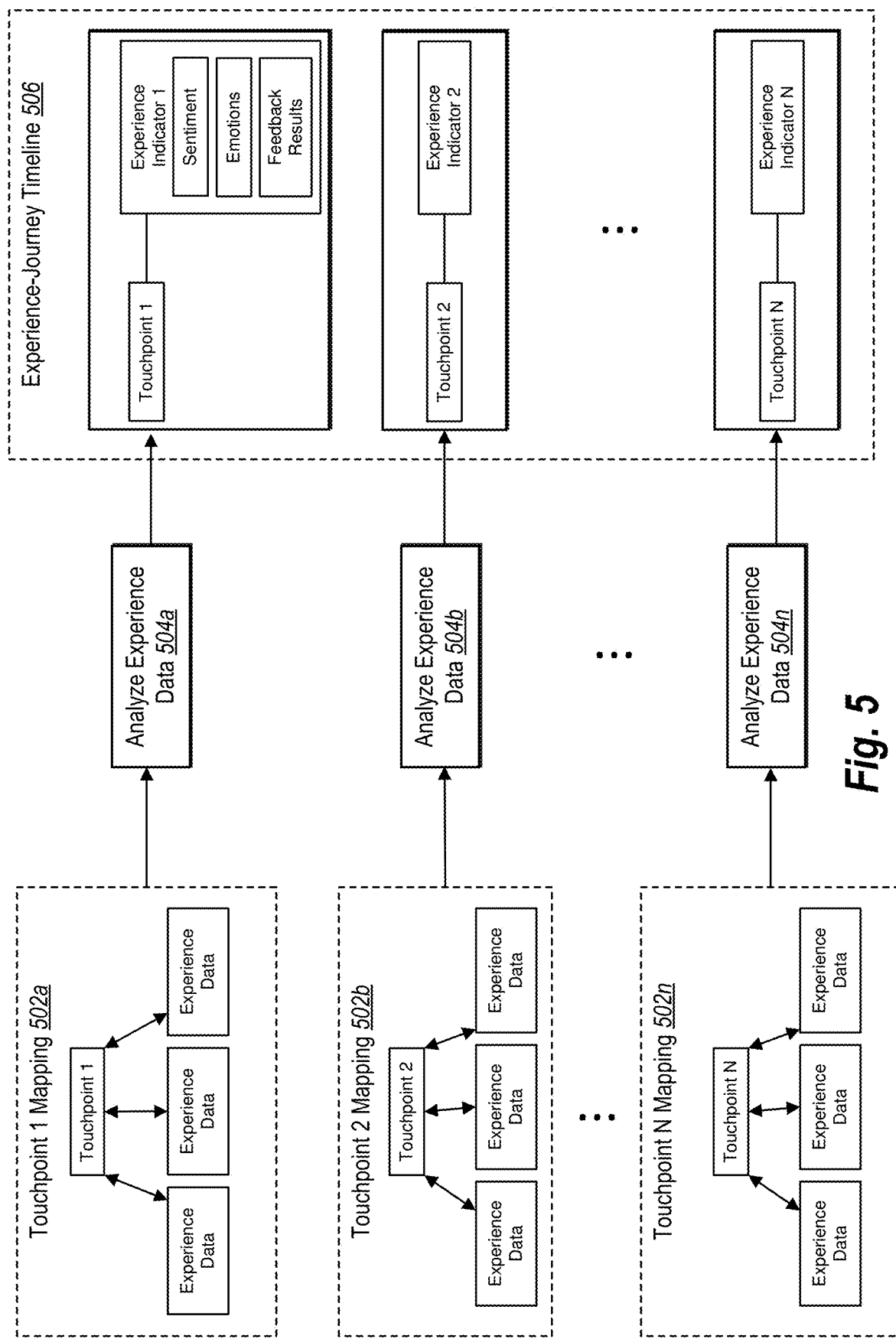
FIG. 5 illustrates a schematic diagram of an experience-journey-timeline system determining experience indicators and generating an experience-journey timeline in accordance with one or more embodiments.

In accordance with one or more embodiments, FIG. 5 illustrates the experience-journey-timeline system 106 generating experience indicators for touchpoints and generating an experience-journey timeline. As shown in FIG. 5, the experience-journey-timeline system 106 utilizes mappings between various touchpoints and experience data. For instance, as illustrated in FIG. 5, a first touchpoint mapping 502*a* includes mappings between a first touchpoint and experience data corresponding to the first touchpoint, a second touchpoint mapping 502*b* includes mappings between a second touchpoint and experience data corresponding to the second touchpoint, and an Nth touchpoint mapping 502*n* includes mappings between an Nth touchpoint and experience data corresponding to the Nth touchpoint.

Subsequently, as shown in FIG. 5, the experience-journey-timeline system 106 analyzes experience data that is mapped to a touchpoint to generate an experience indicator for the touchpoint. For instance, as illustrated in FIG. 5, the experience-journey-timeline system 106 analyzes the experience data corresponding to the first touchpoint mapping 502*a* in an act 504*a* to generate a first experience indicator (e.g., as shown in the experience journey timeline 506).

Moreover, as illustrated in FIG. 5, the experience-journey-timeline system 106 analyzes the experience data corresponding to the second touchpoint mapping 502b in an act 504b to generate a second experience indicator (e.g., as shown in the experience-journey timeline 506). Furthermore, as illustrated in FIG. 5, the experience-journey-timeline system 106 analyzes the experience data corresponding to the Nth touchpoint mapping 502n in an act 504n to generate an Nth experience indicator (e.g., as shown in the experience-journey timeline 506). Moreover, as shown in FIG. 5, the experience-journey-timeline system 106 then utilizes the touchpoints and corresponding experience indicators to generate the experience-journey timeline 506 (e.g., an ordered path of touchpoints with the experience indicators).

The experience-journey-timeline system 106 can generate an experience indicator for a touchpoint by analyzing experience data mapped to the touchpoint. For instance, the experience-journey-timeline system 106 can analyze experience data using any number of approaches to determine a quantifiable or measurable state of an experience associated with the experience data. In particular, the experience-journey-timeline system 106 can analyze the experience data to determine a sentiment, an emotion, or a feedback corresponding to the experience data. For instance, the experience-journey-timeline system 106 can utilize a sentiment analysis, an emotion analysis, and/or a feedback rating system to determine an experience indicator from experience data. In some embodiments, for instance, the experience-journey-timeline system 106 performs a sentiment analysis as described by R. David Norton et al., Intelligently Summarizing and Presenting Textual Responses with Machine Learning, U.S. patent application Ser. No. 16/289,398 (filed Feb. 28, 2019), the entirety of which is hereby incorporated by reference.

As an example, the experience-journey-timeline system 106 can analyze one or more survey responses (as experience data) to determine a sentiment corresponding to the one or more survey responses. For instance, the experience-journey-timeline system 106 can determine a positive sentiment from the one or more survey responses. The experience-journey-timeline system 106 subsequently can utilize the determined positive sentiment as an experience indicator for the touchpoint mapped to the one or more survey responses. Indeed, the experience-journey-timeline system 106 can analyze experience data to generate various combinations of experience indicators from the experience data. For instance, as previously mentioned, the experience-journey-timeline system 106 can analyze experience data (from one or more entities) to determine experience indicators, such as, but not limited to, sentiment indicators (e.g., positive, negative, mixed, mixed positive), emotion indicators (e.g., happiness, anger, excitement), and/or feedback indicators (e.g., likes, dislikes, ratings).

As just mentioned, the experience-journey-timeline system 106 can determine various types of experience indicators (e.g., sentiment indicators, emotion indicators, feedback indicators) and utilize the experience indicators in an experience-journey timeline. For instance, in one or more embodiments, the experience-journey-timeline system 106 can depict that entities are happy (e.g., an emotion indicator) during a first touchpoint and angry during a second touchpoint in an experience journey timeline. Moreover, in some embodiments, the experience-journey-timeline system 106 can depict that entities provide a higher rating (e.g., a feedback indicator) at a first touchpoint and a low rating at a second touchpoint in an experience-journey timeline.

Moreover, the experience-journey-timeline system 106 can determine experience indicators by utilizing experience data that corresponds to various combinations of entities. Indeed, the experience-journey-timeline system 106 can generate an experience indicator for a touchpoint for a single entity, all entities, and/or a segment of users (e.g., multiple individuals or organizations) using experience data mapped to the touchpoint that corresponds to the single entity, all entities, and/or a segment of users. For instance, the experience-journey-timeline system 106 can identify an entity or a segment of users (e.g., multiple individuals or organizations) and then identify experience data (mapped to a touchpoint) that corresponds to the identified entity or the segment of users. The experience-journey-timeline system 106 can further generate an experience indicator specifically for the identified entity or the segment of users for the touchpoint using only the experience data that corresponds to the identified entity or the segment of users.

Furthermore, the experience-journey-timeline system 106 can determine and/or associate a visual attribute with an experience indicator. In particular, the experience-journey-timeline system 106 can associate a visual attribute with an experience indicator that indicates how to display the experience indicator within an experience-journey timeline in a graphical user interface. For instance, the experience-journey-timeline system 106 can utilize various combinations of visual attributes to cause different visual appearances for different experience indicators. For example, the experience-journey-timeline system 106 can associate a first experience indicator (e.g., a positive sentiment) with a first visual attribute (e.g., the color blue) and can associate a second experience indicator (e.g., a negative sentiment) with a second visual attribute (e.g., the color red).

For instance, in some embodiments, the experience-journey-timeline system 106 utilizes rule-based mapping to determine and associate visual attributes with experience indicators. For example, the experience-journey-timeline system 106 can utilize a rule-based mapping that is configured by an administrator of an organization (e.g., the administrator 112) and/or an administrator of the experience-journey-timeline system 106. The rule-based mapping can include types of experience indicators (e.g., sentiment indicator, emotion indicator), different experience indicators within each type (e.g., a positive sentiment, a mixed sentiment, a negative sentiment), and visual attributes for the experience indicators (e.g., a color, shape, size). Indeed, the experience-journey-timeline system 106 can utilize the rule-based mapping to select a visual attribute for an experience indicator.

Furthermore, the experience-journey-timeline system 106 can utilize varying visual attributes (e.g., different color attributes, different shape attributes, different size attributes) depending on a level of magnitude corresponding to an experience indicator. For instance, the experience-journey-timeline system 106 can utilize varying shades of a color to represent different levels of magnitude corresponding to an experience indicator. As an example, the experience-journey-timeline system 106 can utilize different shades of blue to represent different levels of magnitude corresponding to a positive sentiment indicator (e.g., by using a darker shade of blue for very positive sentiment, a lighter shade of blue for a positive sentiment, and an even lighter shade of blue for a mixed positive sentiment).

Moreover, the experience-journey-timeline system 106 can utilize various combinations of visual attributes in association with an experience indicator. For instance, the experience-journey-timeline system 106 can select various combinations of colors, shapes, sizes, shades, textures, and so forth in association with an experience indicator. As an example, the experience-journey-timeline system 106 can utilize a first color and a first shape for a first experience indicator and a second color and a second shape for a second experience indicator.

In some embodiments, the experience-journey-timeline system 106 can determine and associate visual attributes to experience indicators while generating a graphical user interface to display an experience journey timeline (e.g., on a client device). For instance, the experience-journey-timeline system 106 can provide analytics tools that include the rule-based mappings between experience indicators and visual attributes. Upon providing experience indicators for a touchpoint in relation to an entity (or a segment of users) to a client device, the experience-journey-timeline system 106 can cause the client device to determine and associate an appropriate visual attribute with each of the experience indicators.

As mentioned above, the experience-journey-timeline system 106 can generate an experience-journey timeline. In particular, the experience-journey-timeline system 106 can utilize generated experience indicators, associated visual attributes, and touchpoints to generate an experience-journey timeline. For instance, the experience-journey-timeline system 106 can determine a path for the touchpoints and provide experience indicators and visual attributes in connection with the touchpoints within the path to generate an experience-journey timeline.

For instance, the experience-journey-timeline system 106 can determine a path of touchpoints from the available touchpoints. In some embodiments, the experience-journey-timeline system 106 determines a path order for the touchpoints to generate the experience-journey timeline. In one or more embodiments, the experience-journey-timeline system 106 utilizes a provided configuration for an order of the touchpoints and/or metadata (or information) corresponding to the touchpoints to determine an order for the touchpoints. For instance, the experience-journey-timeline system 106 can identify an ordered configuration provided by an organization in relation to the touchpoints to determine an ordered path for the touchpoints. Moreover, the experience-journey-timeline system 106 can also utilize metadata associated with the touchpoints (e.g., a time, location) to determine an order. The experience-journey-timeline system 106 can utilize the determined order to generate an experience-journey timeline that includes a path of touchpoints in connection with experience indicators and visual attributes.

Additionally, the experience-journey-timeline system 106 can generate an experience-journey timeline using various combinations of touchpoints and experience indicators associated with various combinations of entities. For example, the experience-journey-timeline system 106 can generate an experience-journey timeline with touchpoints in connection with experience indicators that are generated for a selected set of entities (e.g., multiple users). Indeed, the experience-journey-timeline system 106 can also generate an experience-journey timeline using a selected set of touchpoints from available touchpoints. For instance, the experience-journey-timeline system 106 can utilize filter (e.g., a time range, a touchpoint category) requests to change the number of touchpoints utilized in generating an experience-journey timeline.

As further mentioned above, the experience-journey-timeline system 106 can provide data corresponding to an experience-journey timeline to a client device for display within a graphical user interface. The experience-journey-timeline system 106 can also provide other functionalities in association with the experience-journey timeline. FIGS. 4-10 illustrate the administrator device 108 presenting graphical user interfaces comprising options or parameters for defining a segment of users and generating such an experience-journey timeline. As explained below, the experience-journey-timeline system 106 provides data to the administrator device 108 to display such an experience journey timeline in response to various user inputs within graphical user interfaces. FIGS. 6A-9C depict the administrator device 108 comprising the administrator device application 110 for the experience-journey-timeline system 106. In some embodiments, the administrator device application 110 comprises computer-executable instructions that cause the administrator device 108 to perform certain actions depicted in FIGS. 6A-9C.

As just noted, in one or more embodiments, the experience-journey-timeline system 106 can create a segment of users for an experience-journey timeline. In particular, the experience-journey-timeline system 106 can generate a graphical user interface for a client device to facilitate the creation of a segment of users for an experience-journey timeline. Indeed, the experience-journey-timeline system 106 can utilize the created segment of users to generate an experience-journey timeline that is specific to the segment of users.

Figure 6A:
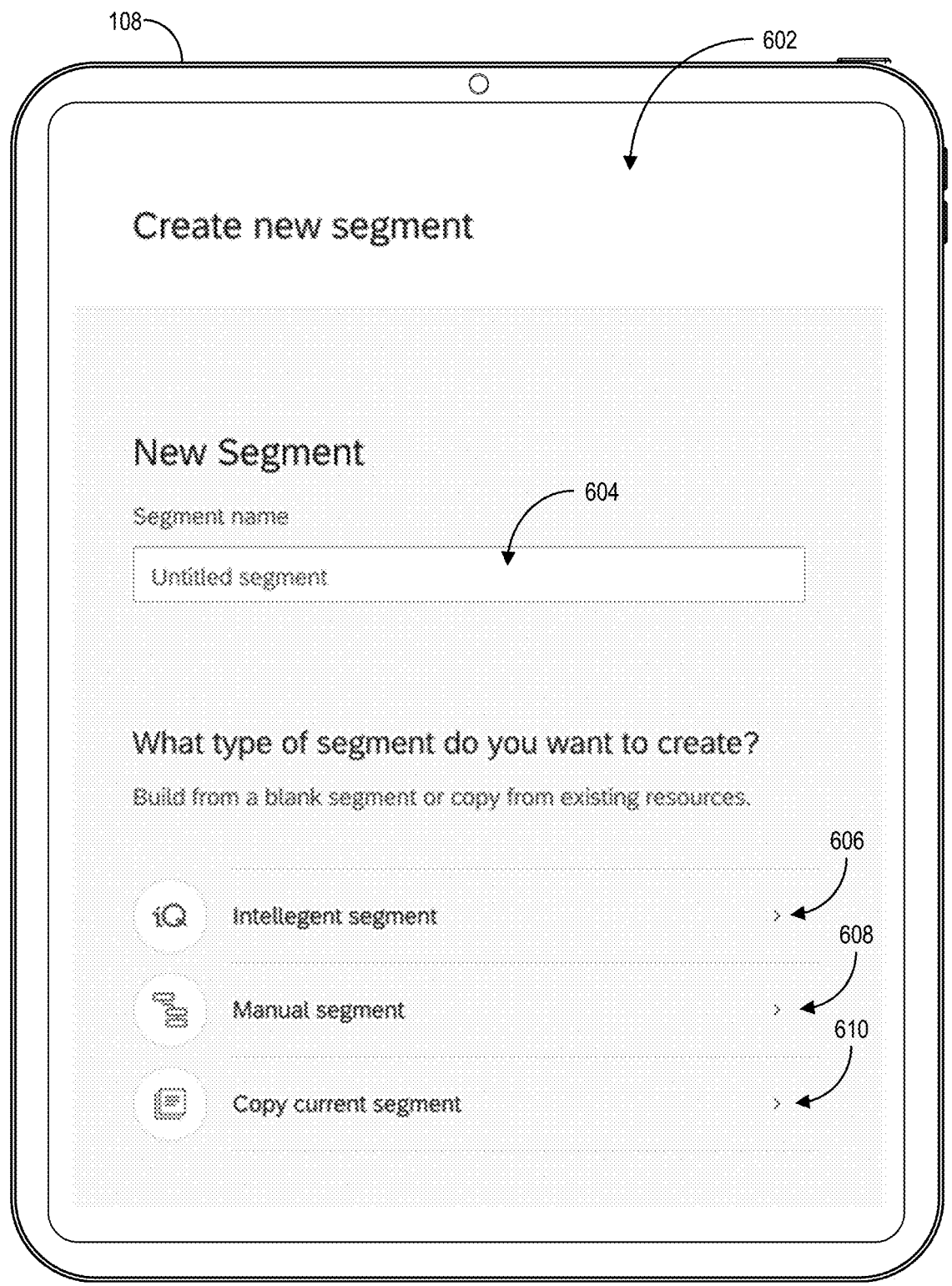
FIG. 6A illustrates a graphical user interface for creating a segment of users in accordance with one or more embodiments.

For example, FIG. 6A illustrates the administrator device 108 presenting a graphical user interface 602 for creating a segment of users. As illustrated in FIG. 6A, the administrator device 108 presents a text box 604 within the graphical user interface 602 for receiving a segment name for a segment of users. Based on user input from the administrator device 108, the experience-journey-timeline system 106 can label a segment of users with the provided segment name and also utilize the segment name to label an experience-journey timeline that corresponds to a created segment of users. Indeed, the experience-journey-timeline system 106 can utilize a created segment of users to determine analytics and/or insights corresponding to individuals or organizations within the segment of users. As previously mentioned, the experience-journey-timeline system 106 can also utilize experience indicators corresponding to individuals or organizations within the segment of users at specific touchpoints to generate an experience-journey timeline for the segment of users.

As shown in FIG. 6A, the administrator device 108 presents selectable options within the graphical user interface 604 to create a segment of users using different approaches. For instance, as shown in FIG. 6A, the administrator device 108 presents a selectable option 606 to use an intelligent segment generator to create a segment of users (e.g., the digital analytics system utilizes information corresponding to individuals or organizations to determine a segment of individuals or organizations that have a significant and common trait). In addition, as illustrated in FIG. 6A, the administrator device 108 also presents a selectable option 608 to use a manual segment to create a segment of users (e.g., a user of the graphical user interface 602 manually selects individuals or organizations to include in the segment of users). Moreover, as shown in FIG. 6A, the administrator device 108 also presents a selectable option 610 to copy a current segment as a segment of users (e.g., a segment of users that are previously selected are used to create a new segment of users).

Furthermore, the experience-journey-timeline system 106 can also provide statistical information (including an overall experience indicator) for various segments of users within a selection menu for a segment of users. For instance, the administrator device 108 can display one or more segments of users and information corresponding to the segment of users within a graphical user interface. In some embodiments, the administrator device 108 also displays single entities within a graphical user interface. Moreover, the administrator device 108 can present selectable options to select a segment of users to view an experience-journey timeline associated with any number of segment of users.

Figure 6B:
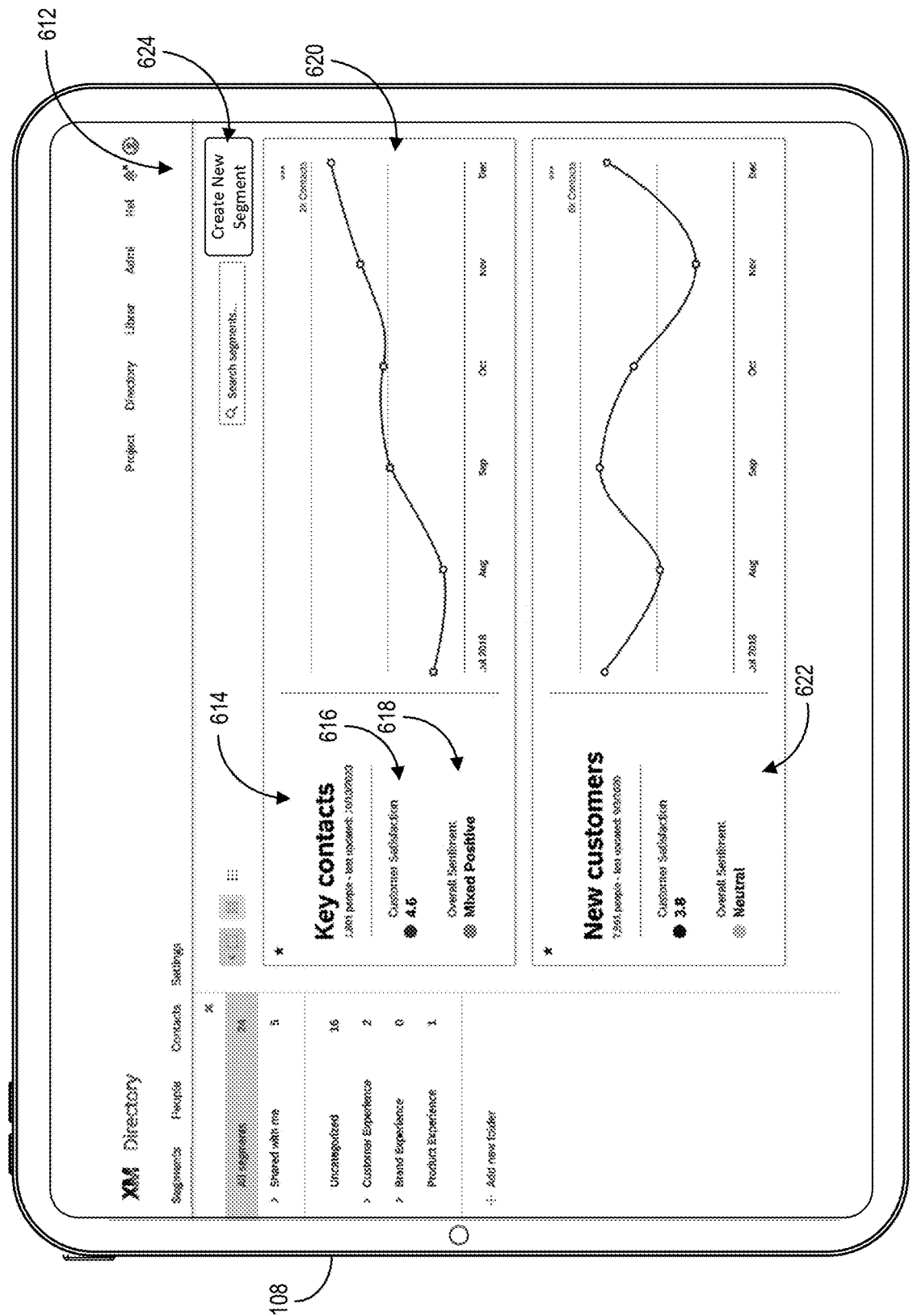
FIG. 6B illustrates a graphical user interface for displaying selectable segments in accordance with one or more embodiments.

For instance, FIG. 6B illustrates the administrator device 108 presenting a graphical user interface 612 for a selection menu of various segments of users. As shown in FIG. 6B, the administrator device 108 can present a selectable element 620 for a segment of users 614 (e.g., "key contacts"). In addition, as illustrated in FIG. 6B, the administrator device 108 can display information corresponding to the segment of users 614 (e.g., number of individuals or organizations within the segment and a last updated date via information from the experience-journey-timeline system 106). Additionally, as shown in FIG. 6B, the experience-journey-timeline system 106 can provide an overall experience indicator 616 and an experience indicator 618 that are determined using experience data corresponding to the segment of users 614 (e.g., across all touchpoints) for display by the administrator device 108. As also shown in FIG. 6B, the administrator device 108 can display a selectable element 622 for a second segment of users (e.g., "new customers") with corresponding information and experience indicators (determined by the experience-journey-timeline system 106).

Furthermore, in one or more embodiments, the administrator device 108 can receive (or detect) a user selection (or interaction) with the selectable element 620 or selectable element 622. For instance, upon receiving an interaction with the selectable element 620, the administrator device 108 can display an experience-journey timeline (and various other information and/or functionalities) corresponding to the selected segment of users (as provided by the experience-journey-timeline system 106). Moreover, as shown in FIG. 6B, the administrator device 108 can also receive a user selection with a selectable element 624 and, in response, can display a graphical user interface for creating a segment of users (as described in FIG. 6A).

As mentioned above, the experience-journey-timeline system 106 can provide an experience-journey timeline for display within a graphical user interface of the administrator device 108. For instance, in one or more embodiments, the administrator device 108 displays an experience journey timeline generated by the experience-journey-timeline system 106 using mappings between touchpoints and experience data for a single entity. Moreover, the experience can display additional information corresponding to the single entity with the experience-journey timeline.

Figure 7A:
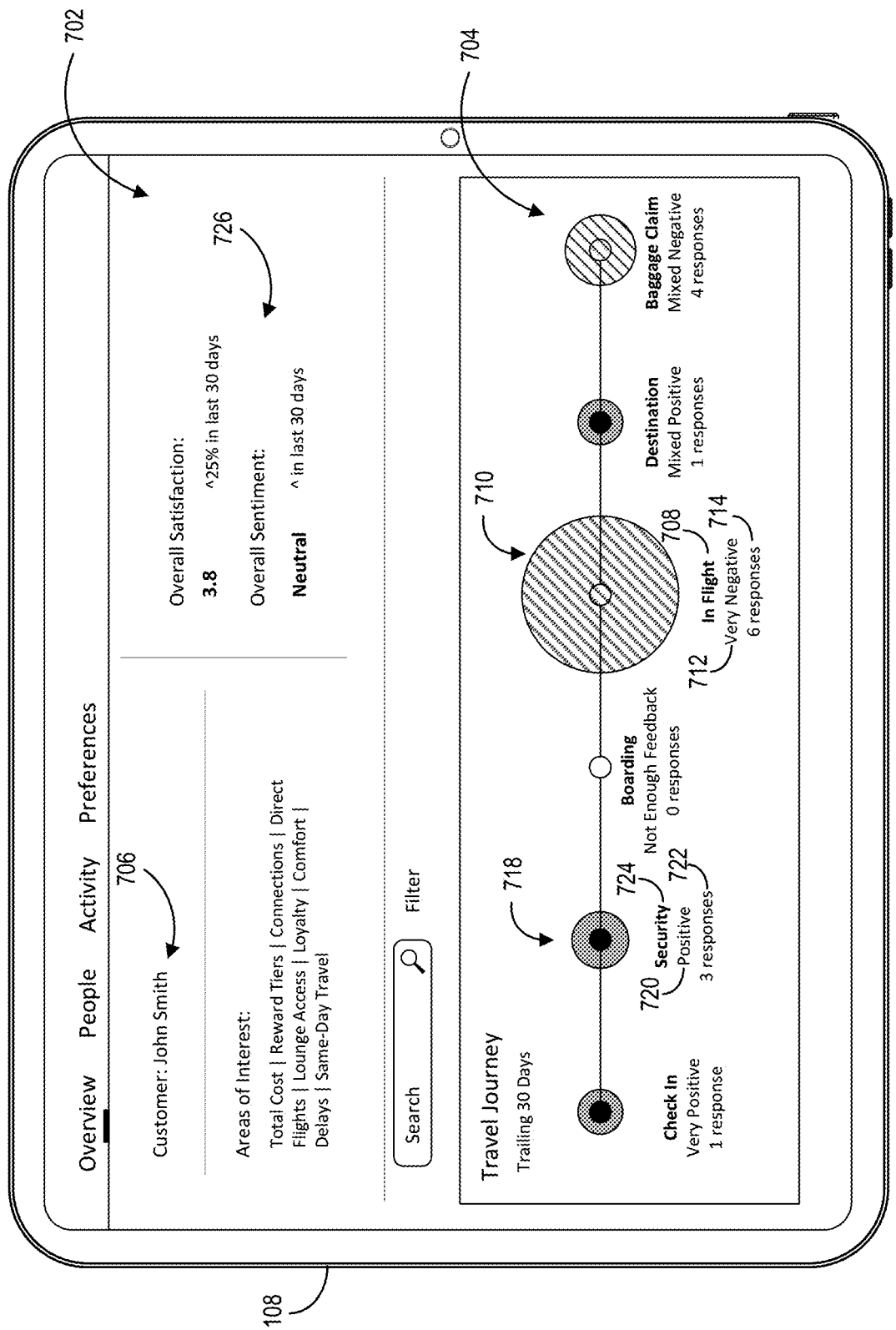
FIG. 7A illustrates a graphical user interface for displaying an experience journey timeline in accordance with one or more embodiments.

As an example, FIG. 7A illustrates the administrator device 108 displaying an experience-journey timeline 704 within a graphical user interface 702 for a single entity 706 (e.g., a single person) that has used an airline (e.g., multiple times in a 30 day span). As shown in FIG. 7A, the administrator device 108 displays the experience-journey timeline 704 to indicate mappings between particular experience indicators (for the entity 706) to particular touchpoints. In particular, as illustrated in FIG. 7A, the administrator device 108 displays a touchpoint 708 ("In-flight") for the entity 706 within a path of touchpoints of the experience-journey timeline 704.

Moreover, as illustrated in FIG. 7A, in connection to the touchpoint 708, the administrator device 108 presents a visual attribute 710 for an experience indicator and a descriptor 712 for the experience indicator. For instance, the visual attribute 710 and the descriptor 712 both indicate a very negative sentiment for the entity 706 at the touchpoint 708. In particular, as shown in FIG. 7A, the experience-journey-timeline system 106 utilizes a visual attribute of a stripe pattern to represent a negative sentiment. Furthermore, as illustrated in FIG. 7A, the administrator device 108 displays the visual attribute 710 as an experience indicator with a larger size to represent a larger number of experience data corresponding to the touchpoint 708 (e.g., the number of responses 714).

As also shown in FIG. 7A, in connection to the touchpoint 724 (e.g., "Security"), the administrator device 108 presents a visual attribute 718 for an experience indicator and a descriptor 720 for the experience indicator. For instance, the visual attribute 718 and the descriptor 720 indicate a positive sentiment for the entity 706 at the touchpoint 724. In particular, as illustrated in FIG. 7A, the experience-journey-timeline system 106 utilizes a visual attribute of a solid filling to represent a positive sentiment. In addition, as illustrated in FIG. 7A, the administrator device 108 displays the visual attribute 718 as an experience indicator with a smaller size (in comparison to the visual attribute 710) to represent a lesser number of experience data corresponding to the touchpoint 724 (e.g., the number of responses 722).

As illustrated in FIG. 7A, the experience-journey-timeline system 106 can utilize different visual attributes to demonstrate different experiences (e.g., via an experience indicator). Although one or more figures illustrate the visual attributes as solid fillings and stripes, the experience-journey-timeline system 106 can utilize any visual attribute including colors. For example, as previously mentioned, the experience-journey-timeline system 106 can utilize a visual attribute of a blue circle to represent positive experience indicators and a red circle to represent negative experience indicators.

In addition, as shown in FIG. 7A, the experience-journey-timeline system 106 can also provide additional information to the administrator device 108 in relation to the experience-journey timeline 704. For example, as illustrated in FIG. 7A, the administrator device 108 displays composite experience indicator 726 (e.g., a satisfaction and sentiment indicator) across all the touchpoints within the experience-journey timeline 704. Moreover, as shown in FIG. 7A, the composite experience indicator 726 indicates a trend corresponding to the overall experience indicators.

In one or more embodiments, as described above, the administrator device 108 can display the experience-journey timeline 704 for any number of touchpoints available to the experience-journey-timeline system 106 (from an organization or entity). Furthermore, the administrator device 108 can display the experience-journey timeline 704 to include experience indicators determined from any number of experience data points available for an entity. Moreover, the experience-journey-timeline system 106 can utilize the experience-journey timeline 704 to display experience indicators of any variety (e.g., sentiments, emotions, feedbacks) within the administrator device 108. In addition, although one or more embodiments herein describe and illustrate experience journey timelines in relation to an airline industry as an example, the experience-journey-timeline system 106 can generate experience-timeline journeys for any variety of situations and/or fields in accordance with one or more embodiments.

Also, as mentioned above, the administrator device 108 can display an experience-journey timeline for a segment of users within a graphical user interface. For instance, in one or more embodiments, the administrator device 108 displays an experience journey timeline for a segment of users generated using mappings between touchpoints and experience data belonging to the segment of users. Furthermore, the experience can display additional information corresponding to the segment of users with the experience-journey timeline.

Figure 7B:
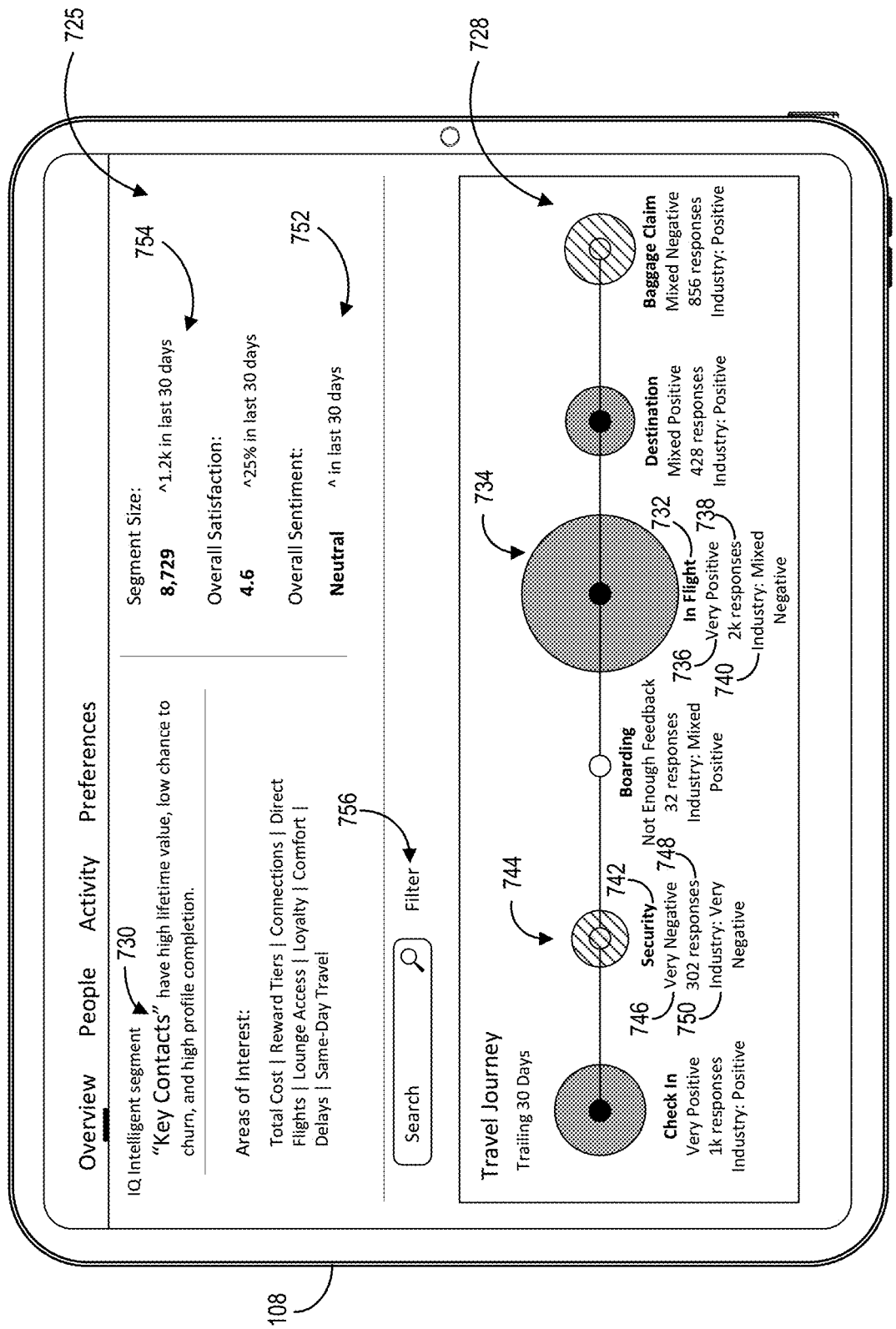
FIG. 7B illustrates a graphical user interface for displaying an experience journey timeline for a segment of users in accordance with one or more embodiments.

For instance, FIG. 7B illustrates the administrator device 108 displaying an experience-journey timeline 728 within a graphical user interface 725 for a segment of users 730 (e.g., "key contacts") that used an airline. As further illustrated in FIG. 7B, the experience-journey-timeline system 106 generates, for display within the administrator device 108, the experience-journey timeline 728 to indicate mappings between particular experience indicators (for the segment of users 730) to particular touchpoints. Specifically, as shown in FIG. 7B, the administrator device 108 displays a touchpoint 732 ("In-flight") for the segment of users 730 within a path of touchpoints of the experience-journey timeline 728.

For instance, as illustrated in FIG. 7B, in connection to the touchpoint 732, the administrator device 108 presents a visual attribute 734 for an experience indicator and a descriptor 736 for the experience indicator. As shown in FIG. 7B, the visual attribute 734 and the descriptor 736, indicate a very positive sentiment for the segment of users 730 at the touchpoint 732. Specifically, as illustrated in FIG. 7B, the experience-journey-timeline system 106 utilizes a visual attribute of a solid filling to represent a positive sentiment. Furthermore, as shown in FIG. 7B, the administrator device 108 displays the visual attribute 734 for the experience indicator with a larger size to represent a larger number of experience data corresponding to the touchpoint 732 (e.g., the number of responses 738 from the segment of users 730).

As further illustrated in FIG. 7B, the administrator device 108 also displays an industry benchmark experience indicator 740 (e.g., "Mixed Negative") in connection with the touchpoint 732. Indeed, the experience-journey-timeline system 106 can generate an industry benchmark experience indicator by utilizing experience data corresponding to a touchpoint from multiple organizations (as described above). In particular, as shown in FIG. 7B, the administrator device 108 displays the industry benchmark experience indicator 740 to show a comparison with the experience indicator via the visual attribute 734 and the descriptor 736.

Additionally, as shown in FIG. 7B, in connection to the touchpoint 742 (e.g., "Security"), the administrator device 108 presents a visual attribute 744 for an experience indicator and a descriptor 746 for the experience indicator. As shown in FIG. 7B, the visual attribute 744 and the descriptor 746 indicate a very negative sentiment for the segment of users 730 at the touchpoint 742. Specifically, as illustrated in FIG. 7B, the experience-journey-timeline system 106 utilizes a visual attribute of a striped pattern to represent a negative sentiment. As also shown in FIG. 7B, the experience-journey-timeline system 106 displays the visual attribute 744 for the experience indicator with a smaller size (in comparison to the visual attribute 734) to represent a lesser number of experience data corresponding to the touchpoint 742 (e.g., the number of responses 748 from the segment of users 730). Furthermore, as shown in FIG. 7B, the administrator device 108 displays an industry benchmark experience indicator 750 ("Very Negative") in connection with the touchpoint 742.

Moreover, as shown in FIG. 7B, the experience-journey-timeline system 106 can also provide additional information in relation to the experience-journey timeline 728. As illustrated in FIG. 7B, the administrator device 108 displays a composite experience indicator 752 (e.g., a satisfaction and sentiment indicator) across all the touchpoints within the experience-journey timeline 728. Moreover, as shown in FIG. 7B, the composite experience indicator 752 indicates a trend corresponding to the overall experience indicators. Furthermore, as shown in FIG. 7B, the experience-journey-timeline system 106 also provides segment size information 754 corresponding to the segment of users which depicts the size of the segment and a trend corresponding to the segment size (e.g., whether there was an increase or decrease in the number of users within the segment) for display in the administrator device 108.

Additionally, the experience-journey-timeline system 106 can facilitate filtering within an experience-journey timeline. For instance, as shown in FIG. 7B, the administrator device 108 can display an option 756 to filter within the experience-journey timeline. For instance, the experience-journey-timeline system 106 can receive a filter request via an interaction with the option 756 (within the administrator device 108) to filter based on any variety of information. For instance, the experience-journey-timeline system 106 can receive a request to filter based on specific characteristics corresponding to the industry (e.g., memberships, loyalty level, delayed customers), demographics of users (e.g., gender, geolocation, age), and/or time ranges. In particular, upon receiving a filter request, the experience-journey-timeline system 106 can filter the users utilized to generate an updated experience-journey timeline and cause the administrator device 108 to display the updated experience-journey timeline with experience indicators that correspond to the filtered users from the segment of users.

Furthermore, in one or more embodiments, the administrator device 108 can provide selectable elements corresponding to touchpoints of an experience-journey timeline within a graphical user interface. In particular, in one or more embodiments, the administrator device 108 detects a user interaction with a selectable element corresponding to a touchpoint and, in response, provides a functionality and/or perform an action. For example, a user interaction can include a cursor selection, a hover action, or a touch action.

In some embodiments, upon detecting a user interaction with a selectable element, the administrator device 108 modifies the visual appearance of a visual attribute corresponding to an experience indicator in connection to a touchpoint of an experience journey timeline within a graphical user interface. Indeed, the administrator device 108 can modify the visual appearance of visual attributes corresponding to multiple touchpoints of an experience-journey timeline. In particular, the administrator device 108 can modify the visual appearance of touchpoints of an experience-journey timeline to highlight specific touchpoints.

Figure 8A:
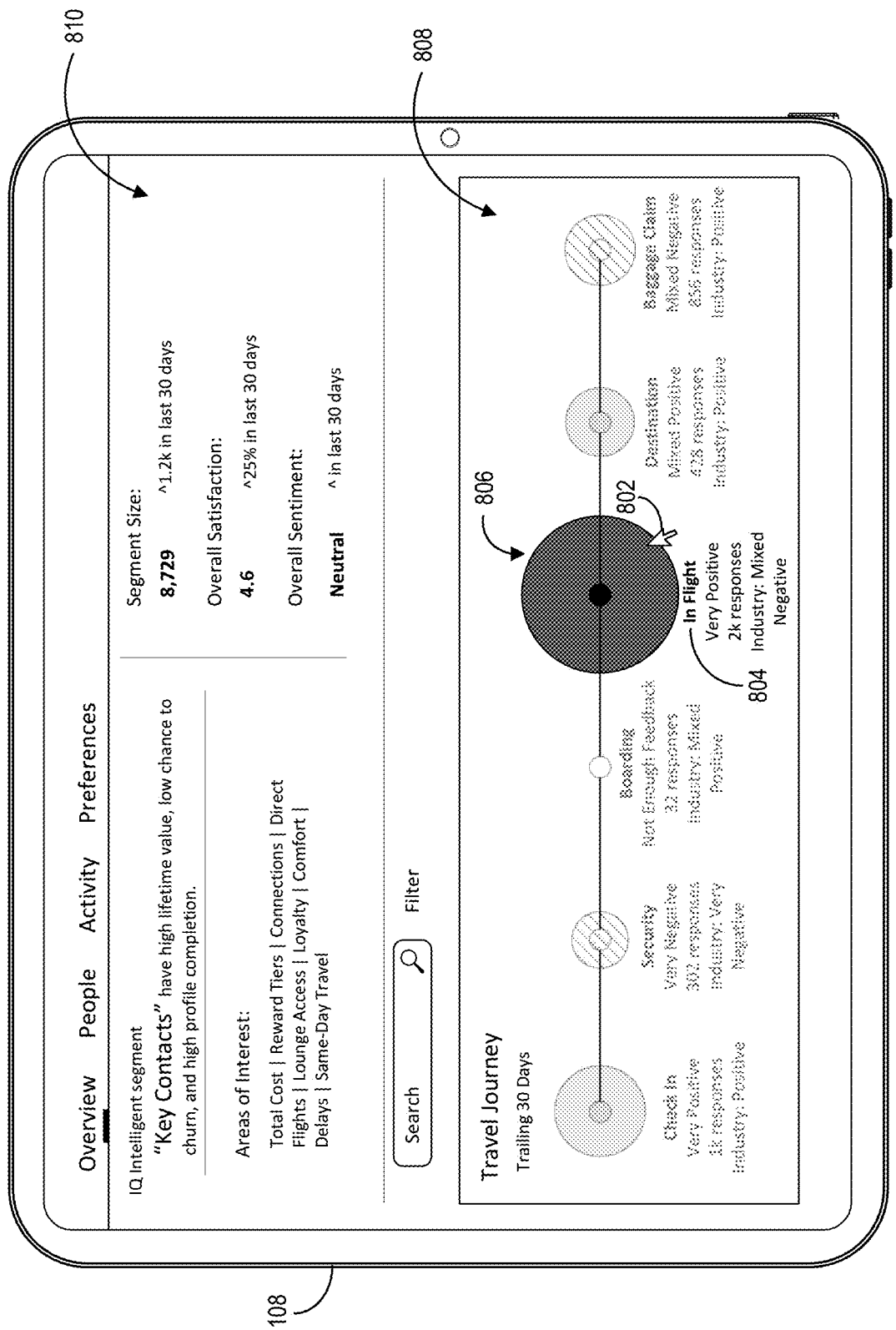
FIGS. 8A and 8B illustrate an experience-journey-timeline system modifying a visual appearance of an experience-journey timeline in response to user interactions in accordance with one or more embodiments.

For example, FIG. 8A illustrates the administrator device 108 modifying a visual appearance of a visual attribute corresponding to a touchpoint of an experience journey timeline within a graphical user interface. For instance, as shown in FIG. 8A, the administrator device 108 detects a user interaction 802 with a touchpoint 804 (or an experience indicator 806 in connection with the touchpoint 804) within a graphical user interface 810. In response, as shown in FIG. 8A, the administrator device 108 can modify the visual appearance of a visual attribute associated with the touchpoint 804 (or other touchpoints in the experience-journey timeline 808). In particular, as illustrated in FIG. 8A, the administrator device 108 maintains the visual appearance of the experience indicator 806 of the touchpoint 804 and fades the other touchpoints within the experience-journey timeline 808 (to emphasize the experience indicator 806 of the touchpoint 804).

Figure 8B:
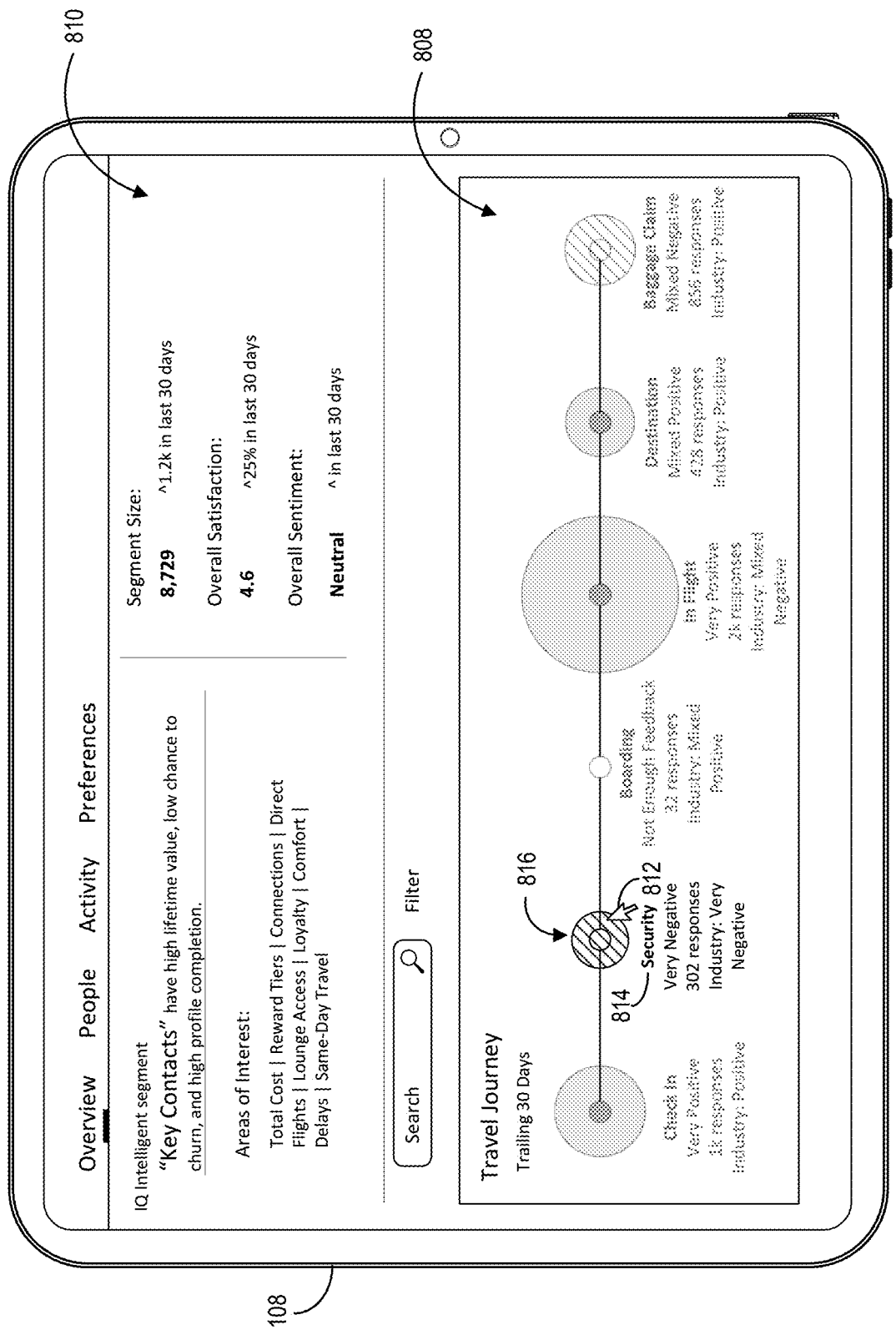

Moreover, as shown in FIG. 8B, the administrator device 108 detects an additional user interaction 812 with a touchpoint 814 (or experience indicator 816) in the experience-journey timeline 808 within a graphical user interface 810. In response, as shown in FIG. 8B, the administrator device 108 modifies the visual appearance of the experience-journey timeline 808. Specifically, as shown in FIG. 8B and in transition from FIG. 8A, the administrator device 108 emphasizes the visual appearance of the experience indicator 816 corresponding to the touchpoint 814 (e.g., darkens or maintains a color) and fades the other touchpoints within the experience-journey timeline 808 (e.g., fades the visual appearance of the experience indicator 806 of the touchpoint 804).

As mentioned above, the experience-journey-timeline system 106 can provide interactive tools and/or functionalities corresponding to an experience-journey timeline. For instance, as previously mentioned, the experience-journey-timeline system 106 can provide possible actions related to a touchpoint, entity provided recommendations, entity information for an entity, and/or statistical evaluations. Indeed, the administrator device 108 can present such interactive tools and/or functionalities as selectable options within a graphical user interface in relation to an experience-journey timeline.

Figure 9A:
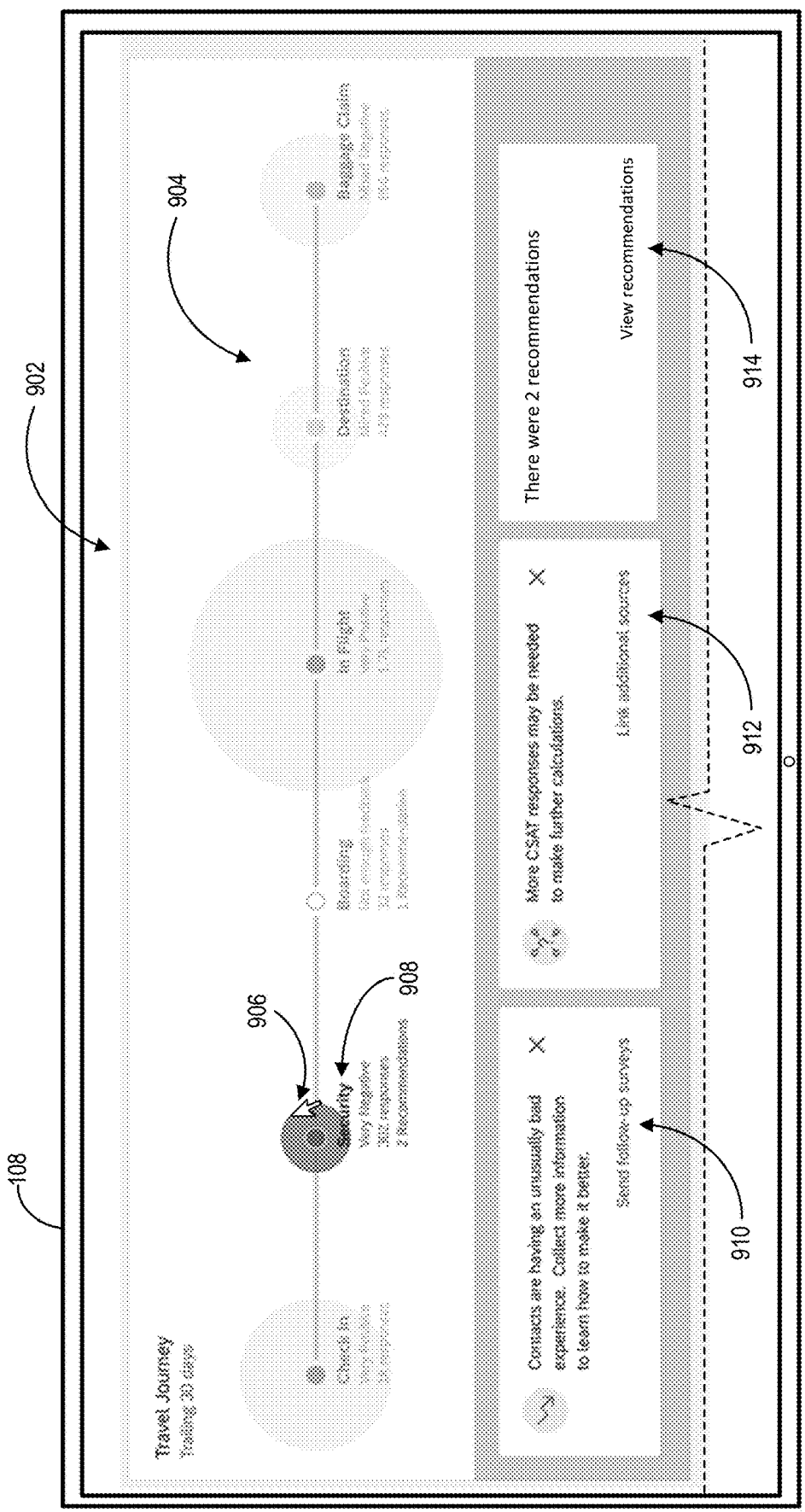
FIGS. 9A-9C illustrate an experience-journey-timeline system providing functionalities and touchpoint information in relation to an experience-journey timeline in accordance with one or more embodiments.

For example, FIG. 9A illustrates the administrator device 108 displaying interactive tools and/or functionalities in relation to an experience-journey timeline. As shown in FIG. 9A, the administrator device 108 detects a user interaction 906 with a touchpoint 908 (or an experience indicator associated with the touchpoint 908) in an experience journey timeline 904 within a graphical user interface 902. The experience-journey-timeline system 106 provides, in response to the user interaction 906, a proposed action 910 (for a follow-up survey) related to the touchpoint 908, a proposed action 912 (to link additional sources) related to the touchpoint 908, and a proposed action 914 (to view entity provided recommendations) related to the touchpoint 908. In some embodiments, the experience-journey-timeline system 106 can provide such interactive tools and/or functionalities in relation to the experience journey timeline without detecting a user interaction with a touchpoint.

Although FIG. 9A illustrates the administrator device 108 presenting proposed actions to distribute additional surveys, link additional resources, and view recommendations from entities, the experience-journey-timeline system 106 can provide any number of and various combinations of interactive tools and functionalities in relation to a touchpoint and/or an experience-journey timeline for display on the administrator device 108. For example, the administrator device 108 can present an option to distribute additional surveys and link additional resources for a touchpoint. Indeed, upon detecting an interaction for the option to distribute additional surveys and link additional resources for the touchpoint at the administrator device 108, the experience-journey-timeline system 106 can both distribute additional digital surveys to entities corresponding to the touchpoint and link additional resources (e.g., customer service data) for the touchpoint.

In one or more embodiments, upon detecting a user interaction with the proposed action 910, the administrator device 108 can present options for distributing additional digital surveys. In particular, the administrator device 108 can present options to distribute digital surveys through email, a website link, social media, mobile application, or short message service ("SMS") text. For instance, the digital analytics system 104 or the experience-journey-timeline system 106 can provide the survey distribution options described by Jared Smith et al., Guiding Creation of an Electronic Survey, U.S. patent application Ser. No. 15/339, 169 (filed Oct. 31, 2016), the entirety of which is hereby incorporated by reference. In some cases, the administrator device 108 provides such options to distribute additional surveys to users that correspond to the selected touchpoint 908. Indeed, the experience-journey-timeline system 106 can provide the additional digital surveys to the entity or segment of users that are associated with the experience-journey timeline 904.

As an example, the administrator device 108 can detect an interaction with an option to distribute additional digital surveys for a specific touchpoint. Upon receiving an indication from the administrator device 108 to distribute additional digital surveys for the specific touchpoint, the experience-journey-timeline system 106 can identify entities that correspond to the touchpoint and determine a digital survey that also corresponds to the touchpoint. Then, the experience-journey-timeline system 106 can distribute the digital survey to these entities. Indeed, the distribution of the digital survey can be configured based on options selected on the administrator device 108. For example, the experience-journey-timeline system 106 can receive a request (via a detected selection of the option to distribute a digital survey on the administrator device 108) to distribute digital surveys to entities corresponding to a touchpoint through email and only to entities with responses corresponding to a "very negative" experience (or sentiment).

Moreover, as shown in FIG. 9A, the experience-journey-timeline system 106 can also link additional resources for customer statistics in relation to the touchpoint upon detecting, by the administrator device 108, a user interaction with the action 912. For instance, as illustrated in FIG. 9A, the experience-journey-timeline system 106 can identify additional data sources to gain more insight into an entity and/or segment of users corresponding to the experience-journey timeline 904. Then, the experience-journey-timeline system 106 can utilize the additional data sources to determine and provide additional customer statistics (e.g., customer satisfaction reports) in relation to an entity and/or segment of users corresponding to the experience-journey timeline 904 (e.g., for display by the administrator device 108).

In some embodiments, as illustrated in FIG. 9A, upon detecting a user interaction with the proposed action 914, the administrator device 108 can display recommendations provided by an entity and/or segment of users corresponding to the experience-journey timeline 904 (in relation to the touchpoint 908). Indeed, the recommendations can be related to the selected touchpoint 908. Specifically, the experience-journey-timeline system 106 can identify recommendations from experience data from one or more computing devices associated with an entity and/or segment of users corresponding to the experience-journey timeline 904 for display within the administrator device 108. For example, the experience-journey-timeline system 106 can receive, from one or more computing devices associated with an entity, recommendations (e.g., possible improvements for a service, strengths, weaknesses, comments) for interactions with a specific touchpoint. Then, the administrator device 108 can display such recommendations upon detecting a user interaction with the proposed action 914 within an additional user interface (or within the graphical user interface 902). To illustrate, the administrator device 108 can present recommendations provided by one or more computing devices associated with entities in relation to the touchpoint 908 (e.g., recommendations provided by entities for possible improvements during airline security).

Furthermore, the administrator device 108 can also present additional information corresponding to an entity and/or segment of users corresponding to the experience journey timeline. For instance, the experience-journey-timeline system 106 can provide additional information such as, but not limited to, distribution information, summaries of evaluated experience data, and/or other sentiment/satisfaction data (for display within the administrator device 108). Indeed, the administrator device 108 can present such additional information in response to detecting a selection of a touchpoint (or experience indicator) within an experience-journey timeline. For example, FIGS. 9B and 9C illustrate the administrator device 108 presenting additional information (within the scrollable, graphical user interface 902) upon detecting the user interaction 906 with the touchpoint 908 (or the experience indicator associated with the touchpoint 908).

Figure 9B:
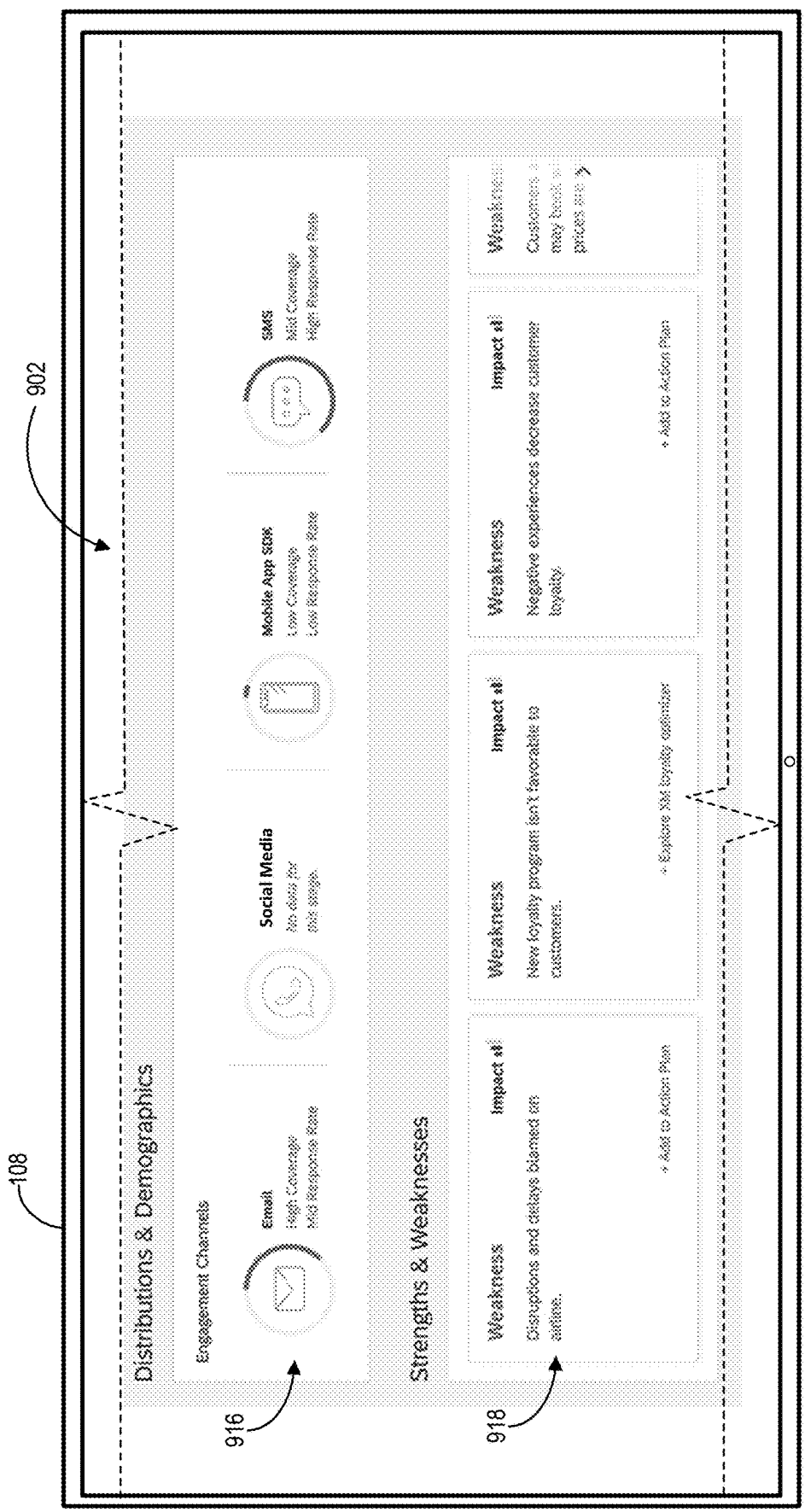
Figure 9C:
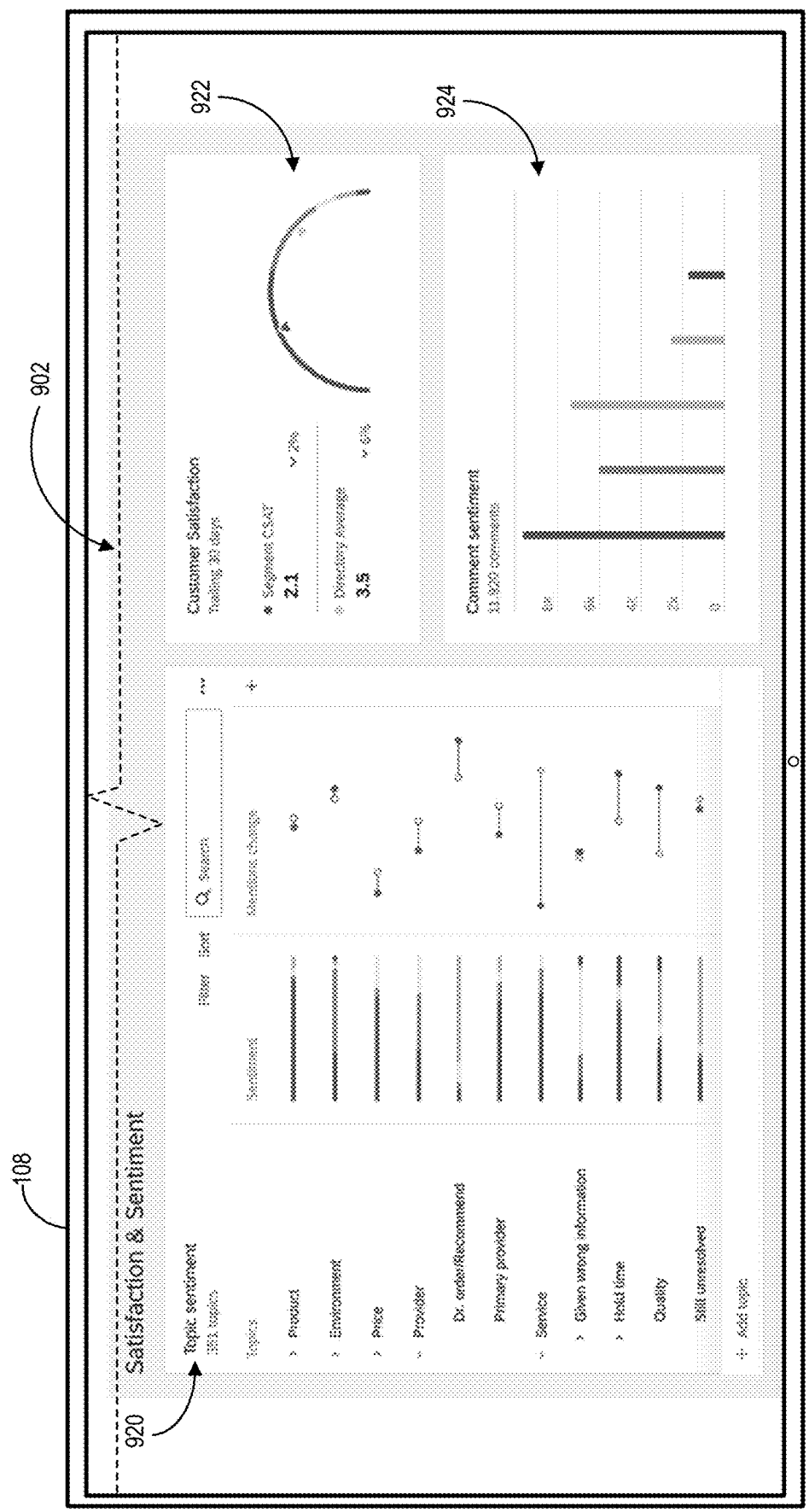

For instance, as illustrated in FIG. 9B, the administrator device 108 presents distribution information 916. Indeed, as shown in FIG. 9B, the distribution information 916 can provide information on how experience data for an entity (and/or segment of users) corresponding to the experience journey timeline 904 is collected. For instance, as illustrated in FIG. 9B, the distribution information 916 indicates a relative amount of survey responses coming from different distribution channels, such as email, social media, mobile application, or SMS. The distribution information 916 indicates that most of the experience data corresponding to the touchpoint 908 in the experience-journey timeline 904 was provided via SMS and email.

Additionally, as shown in FIG. 9B, the administrator device 108 provides high level summary data 918 (as "Strengths & Weaknesses"). In particular, as shown in FIG. 9B, the high level summary data 918 can provide high level summaries determined by the experience-journey-timeline system 106 (or digital analytics system 104) from experience data for an entity (and/or segment of users) corresponding to the experience-journey timeline 904. Indeed, experience-journey-timeline system 106 (or digital analytics system 104) can analyze the experience data to determine high level summaries (e.g., reasons why a particular sentiment is associated with a touchpoint).

For example, as shown in FIG. 9B, the experience-journey-timeline system 106 can determine that the experience data corresponding to the entity (and/or segment of users) for the experience-journey timeline 904 illustrates that the "very negative" experience indicator for the touchpoint 908 is a result of "disruptions and delays." Indeed, the experience-journey-timeline system 106 can determine such high level summaries in response to detecting a selection of a touchpoint within an experience-journey timeline and/or in response to displaying an experience-journey timeline. Additionally, as shown in FIG. 9B, the administrator device 108 can also present functionalities and/or tools accessible via selectable options with the high level summary data 918 (e.g., to add an action plan and explore marketing optimizers).

Moreover, as shown in FIG. 9C, the experience-journey-timeline system 106 can provide sentiment and/or satisfaction evaluations for a touchpoint corresponding to an entity (and/or segment of users) for the experience-journey timeline 904. In some embodiments, the experience-journey-timeline system 106 provides sentiment and/or satisfaction information that is associated with a touchpoint (e.g., the information is determined for experience data and/or other data that is mapped to the touchpoint). Moreover, in one or more embodiments, the experience-journey-timeline system 106 provides sentiment and/or satisfaction information that corresponds to an entity (and/or segment of users) in association with more than one touchpoint (e.g., using data mapped to all of the touchpoints corresponding to the experience-journey timeline).

For instance, as shown in FIG. 9C, the administrator device 108 presents information related to topics in a topics sentiment section 920. Indeed, the administrator device 108 presents sentiment indicators related to topics (e.g., topics mentioned by an entity or a segment of users) in the topics sentiment section 920. In some embodiments, the administrator device 108 displays the topics sentiment section 920 to provide sentiment indicators for topics determined from experience data that is mapped to the selected touchpoint 908 (by the experience-journey-timeline system 106). As shown in FIG. 9C, the administrator device 108 displays sentiment indicators determined for various topics and an illustration of how often those topics are mentioned within the topics sentiment section 920 in the scrollable, graphical user interface 902.

Furthermore, as illustrated in FIG. 9C, the administrator device 108 also presents a customer satisfaction section 922 in the scrollable, graphical user interface 902. For instance, as illustrated in FIG. 9C, the experience-journey-timeline system 106 provides the customer satisfaction section 922 that provides customer satisfaction statistics for a segment of users (for the experience-journey timeline 904). Moreover, as shown in FIG. 9C, the administrator device 108 also presents trends corresponding to the customer satisfaction statistics for a segment of users in the customer satisfaction section 922. Additionally, as shown in FIG. 9C, the administrator device 108 also presents an average customer satisfaction statistic and trend for all available entities (e.g., corresponding to the organization using the experience-journey-timeline system 106). Indeed, the experience-journey-timeline system 106 can determine information for the customer satisfaction section 922 using experience data that corresponds to an entity or a segment of users corresponding to a touchpoint and/or multiple touchpoints within an experience-journey timeline.

Moreover, as shown in FIG. 9C, the administrator device 108 presents a comment sentiment section 924 in the scrollable, graphical user interface 902. For example, as shown in FIG. 9C, the administrator device 108 provides the comment sentiment section 924 that provides an analysis on the number of comments for different sentiment indicators. For instance, the experience-journey-timeline system 106 can determine experience indicators (e.g., a sentiment indicator) for individual experience data points (e.g., a single survey response, a social media comment). Then, the experience-journey-timeline system 106 can count the number of experience indicators across the individual experience data points. As illustrated in FIG. 9C, the administrator device 108 displays, within the comment sentiment section 924, the number of experience data points (e.g., comments) within each experience indicator (e.g., represented as different shades in the bar graph).

Figure 10:
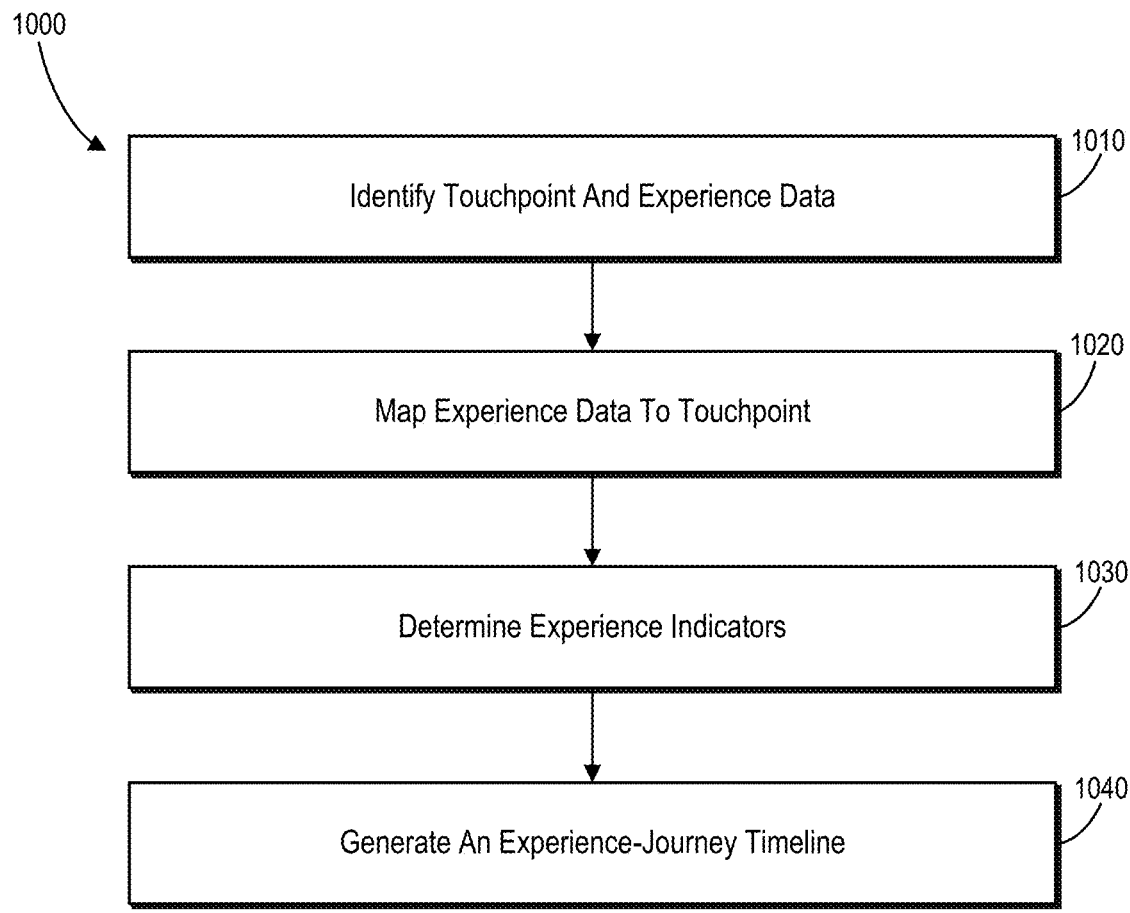
FIG. 10 illustrates a flowchart of a series of acts for using mappings between experience data and touchpoint data to generate experience-journey timelines within one or more embodiments.

Turning now to FIG. 10, this figure illustrates a flowchart of a series of acts 1000 of using mappings between experience data and touchpoint data to generate experience journey timelines within one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable storage medium can comprise instructions that, when executed by one or more processors, cause a computing device to perform the acts depicted in FIG. 10. In still further embodiments, a system can perform the acts of FIG. 10.

As shown in FIG. 10, the acts 1000 include an act 1010 of identifying touchpoint and experience data. In particular, the act 1010 can include identifying a set of touchpoints and an experience dataset indicating experiences of an entity. For instance, a set of touchpoints can include interactions corresponding to an entity with another entity.

As further shown in FIG. 10, the acts 1000 include an act 1020 of mapping experience data to a touchpoint. In particular, the act 1020 can include mapping an experience dataset to a set of touchpoints.

As further shown in FIG. 10, the acts 1000 include an act 1030 of determining experience indicators. In particular, the act 1030 can include determining a set of experience indicators representing an experience dataset of an entity. For instance, an experience indicator can include a representation of a sentiment, an emotion, or a feedback.

As further shown in FIG. 10, the acts 1000 include an act 1040 of generating an experience-journey timeline. In particular, the act 1040 can include generating an experience-journey timeline indicating mappings between particular experience indicators from a set of experience indicators to particular touchpoints from a set of a set of touchpoints. Additionally, the act 1040 can include providing an experience journey timeline for display within a graphical user interface of a client device. For example, an experience-journey timeline can indicate a first mapping between a first experience indicator corresponding to a first visual attribute and a first touchpoint and a second mapping between a second experience indicator corresponding to a second visual attribute and a second touchpoint. In addition, the act 1040 can include generating an experience-journey timeline for a segment of users indicating mappings between particular experience indicators corresponding to the segment of users and particular touchpoints from a set of touchpoints.

Moreover, the act 1040 can include providing an experience-journey timeline to cause the client device to display particular experience indicators in connection with particular touchpoints from a set of touchpoints within a graphical user interface. Additionally, the act 1040 can include providing an experience-journey timeline to cause the client device to display a first experience indicator in connection with a first touchpoint using a first visual attribute. For example, a visual attribute (a first visual attribute) can include at least one of a color attribute, a shape attribute, or a size attribute. Moreover, the act 1040 can include providing an experience-journey timeline to cause the client device to display a second experience indicator in connection with a second touchpoint using a second visual attribute. For instance, a first visual attribute can be visually different from a second visual attribute. Moreover, the act 1040 can include providing an experience-journey timeline for a segment of users to cause a client device to display particular experience indicators corresponding to a segment of users in connection with particular touchpoints from a set of touchpoints within a graphical user interface.

Furthermore, the act 1040 can include providing an experience-journey timeline to cause the client device to detect a user interaction with a selectable element corresponding to a touchpoint of an experience-journey timeline within a graphical user interface. Moreover, the act 1040 can include, in response to detecting a user interaction, modifying a visual appearance of a visual attribute corresponding to an experience indicator in connection to a touchpoint of an experience-journey timeline within a graphical user interface. In addition, the act 1040 can include, in response to detecting a user interaction, displaying possible actions related to a touchpoint, entity-provided recommendations, entity information for an entity, or statistical evaluations for a touchpoint of an experience-journey timeline within a graphical user interface. Additionally, the act 1040 can include, providing an experience-journey timeline to cause the client device to display a selectable option to send a digital survey corresponding to a touchpoint of the experience-journey timeline within a graphical user interface. In addition, the act 1040 can include distributing a digital survey corresponding to a touchpoint to an entity in response to receiving an indication of a user interaction with a selectable option on a client device.

Figure 11:
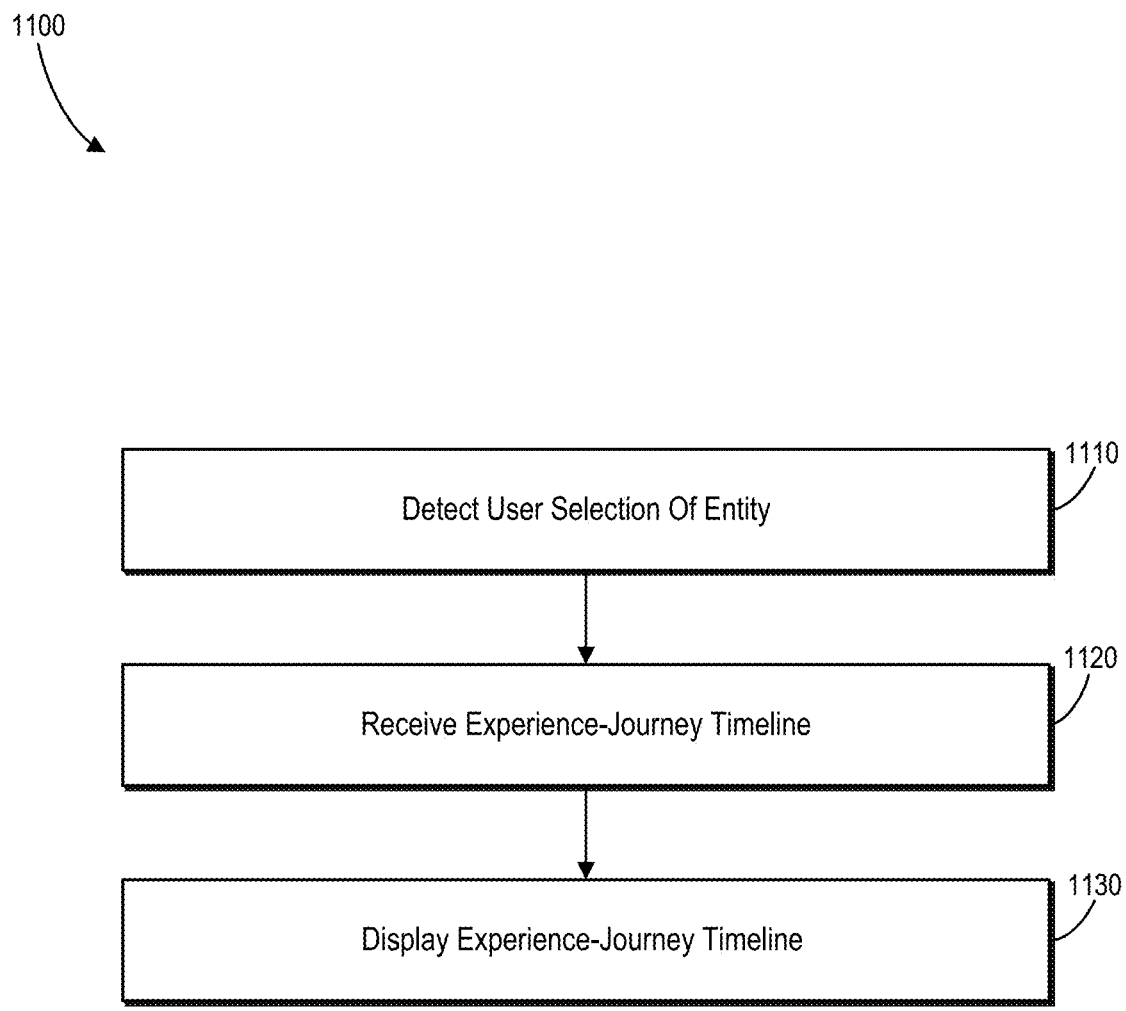
FIG. 11 illustrates a flowchart of a series of acts for displaying an experience-journey timeline within a graphical user interface in accordance with one or more embodiments.

Turning now to FIG. 11, this figure illustrates a flowchart of a series of acts 1100 of displaying an experience-journey timeline within a graphical user interface in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable storage medium can comprise instructions that, when executed by one or more processors, cause a computing device to perform the acts depicted in FIG. 11. In still further embodiments, a system can perform the acts of FIG. 11.

As shown in FIG. 11, the acts 1100 include an act 1110 of detecting a user selection of an entity. In particular, the act 1110 can include detecting a user selecting of an entity within a graphical user interface. Furthermore, the act 1110 can include detecting a user selection of a segment of users within a graphical user interface.

As further shown in FIG. 11, the acts 1100 include an act 1120 of receiving an experience-journey timeline. In particular, the act 1120 can include, in response to detecting a user selection of an entity, receiving an experience-journey timeline. For instance, an experience-journey timeline can indicate mappings between particular experience indicators from a set of experience indicators to particular touchpoints from a set of touchpoints. Additionally, the act 1120 can include, in response to detecting a user selection of a segment of users, receiving an experience journey timeline for the segment of users. For example, an experience-journey timeline (for a segment of users) can indicate mappings between particular experience indicators corresponding to a segment of users and particular touchpoints from a set of touchpoints. Furthermore, a set of touchpoints can include interactions corresponding to an entity with another entity.

As further shown in FIG. 11, the acts 1100 include an act 1130 of displaying an experience-journey timeline. In particular, the act 1130 can include displaying an experience-journey timeline within a graphical user interface by displaying particular experience indicators in connection with particular touchpoints from a set of touchpoints. Furthermore, the act 1130 can include displaying a first experience indicator in connection with a first touchpoint using a first visual attribute. For example, a visual attribute can include at least one of a color attribute, a shape attribute, or a size attribute. Additionally, the act 1130 can include displaying a second experience indicator in connection with a second touchpoint using a second visual attribute. For instance, a first visual attribute is visually different from a second visual attribute. In addition, the act 1130 can include displaying an experience-journey timeline within a graphical user interface by displaying particular experience indicators corresponding to a segment of users in connection with particular touchpoints from a set of touchpoints. For example, an experience indicator can include a representation of a sentiment, an emotion, or a feedback.

Moreover, the act 1130 can include detecting a user interaction with a selectable element corresponding to a touchpoint of an experience-journey timeline within a graphical user interface. Additionally, the act 1130 can include, in response to detecting a user interaction with a selectable element, modifying a visual appearance of a visual attribute corresponding to an experience indicator in connection to a touchpoint of an experience-journey timeline within a graphical user interface. In addition, the act 1130 can include, in response to detecting a user interaction with a selectable element, displaying possible actions related to a touchpoint, entity-provided recommendations, entity information for the entity, or statistical evaluations for the touchpoint corresponding to the touchpoint of an experience-journey timeline within a graphical user interface.

Furthermore, the act 1130 can include displaying a selectable option to send a digital survey corresponding to a touchpoint of an experience-journey timeline within a graphical user interface. Moreover, the act 1130 can include detecting a user interaction with a selectable option (to send a digital survey corresponding to a touchpoint). Additionally, the act 1130 can include, based on detecting a user interaction (with a selectable option to send a digital survey corresponding to a touchpoint), presenting distribution options for distributing a digital survey corresponding to a touchpoint to an entity.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 12:
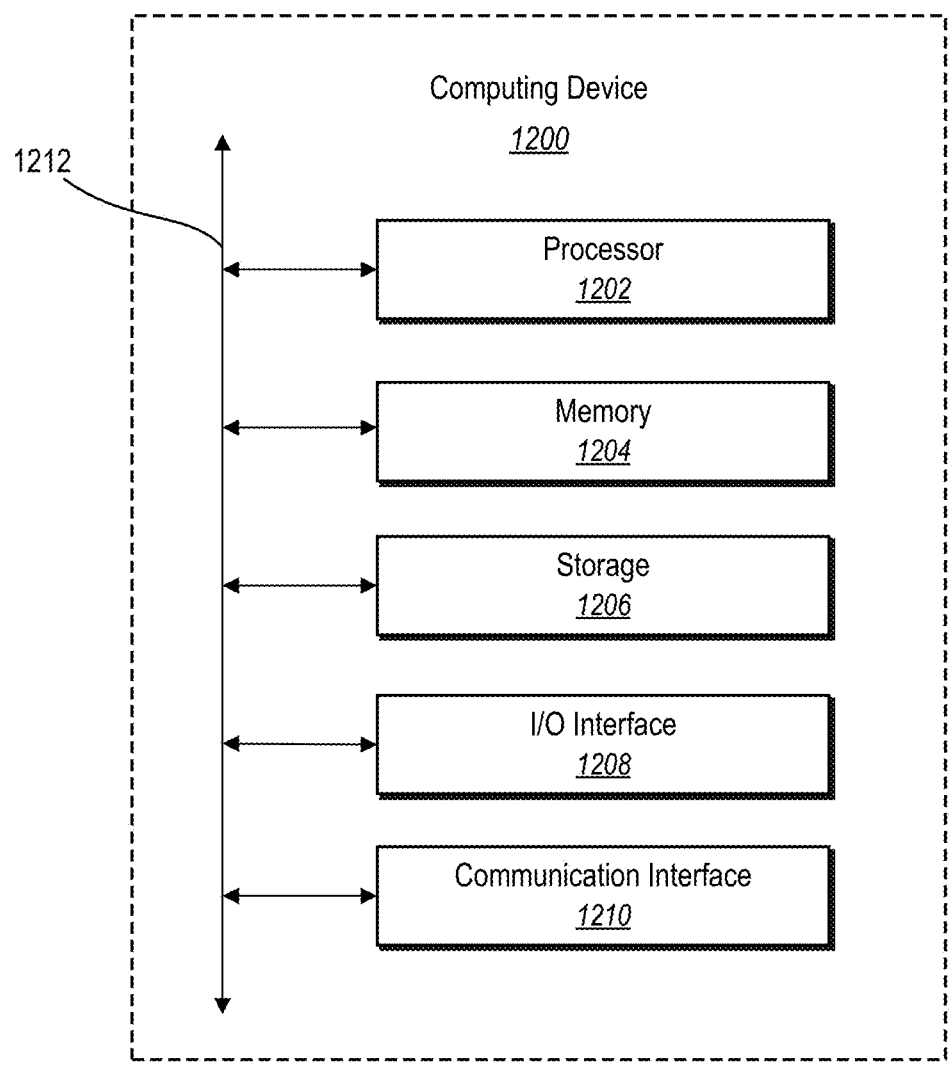
FIG. 12 illustrates a block diagram of a computing device in accordance with one or more embodiments.

FIG. 12 illustrates a block diagram of an exemplary computing device 1200 that may be configured to perform one or more of the processes described above. One will appreciate that one or more computing devices such as the computing device 1200 may implement the administrator device 108 (as a client device), the respondent devices 114a-114n, the server device(s) 102, and/or other devices described above in connection with FIG. 1. As shown by FIG. 12, the computing device 1200 can comprise a processor 1202, a memory 1204, a storage device 1206, an I/O interface 1208, and a communication interface 1220, which may be communicatively coupled by way of a communication infrastructure 1212. While the exemplary computing device 1200 is shown in FIG. 12, the components illustrated in FIG. 12 are not intended to be limiting. Additional or alternative components may be used in other embodiments. Furthermore, in certain embodiments, the computing device 1200 can include fewer components than those shown in FIG. 12. Components of the computing device 1200 shown in FIG. 12 will now be described in additional detail.

In one or more embodiments, the processor 1202 includes hardware for executing instructions, such as those making up a computer program. As an example and not by way of limitation, to execute instructions, the processor 1202 may retrieve (or fetch) the instructions from an internal register, an internal cache, the memory 1204, or the storage device 1206 and decode and execute them. In one or more embodiments, the processor 1202 may include one or more internal caches for data, instructions, or addresses. As an example and not by way of limitation, the processor 1202 may include one or more instruction caches, one or more data caches, and one or more translation lookaside buffers ("TLBs"). Instructions in the instruction caches may be copies of instructions in the memory 1204 or the storage device 1206.

The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The storage device 1206 includes storage for storing data or instructions. As an example and not by way of limitation, storage device 1206 can comprise a non-transitory storage medium described above. The storage device 1206 may include a hard disk drive ("HDD"), a floppy disk drive, flash memory, an optical disc, a magneto-optical disc, magnetic tape, or a Universal Serial Bus ("USB") drive or a combination of two or more of these. The storage device 1206 may include removable or non-removable (or fixed) media, where appropriate. The storage device 1206 may be internal or external to the computing device 1200. In one or more embodiments, the storage device 1206 is non-volatile, solid-state memory. In other embodiments, the storage device 1206 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 1208 allows a user to provide input to, receive output from, and otherwise transfer data to and receive data from the computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1220 can include hardware, software, or both. In any event, the communication interface 1220 can provide one or more interfaces for communication (such as, for example, packet-based communication) between the computing device 1200 and one or more other computing devices or networks. As an example and not by way of limitation, the communication interface 1220 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 1220 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 1220 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 1220 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1212 may include hardware, software, or both that couples components of the computing device 1200 to each other. As an example and not by way of limitation, the communication infrastructure 1212 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

Figure 13:
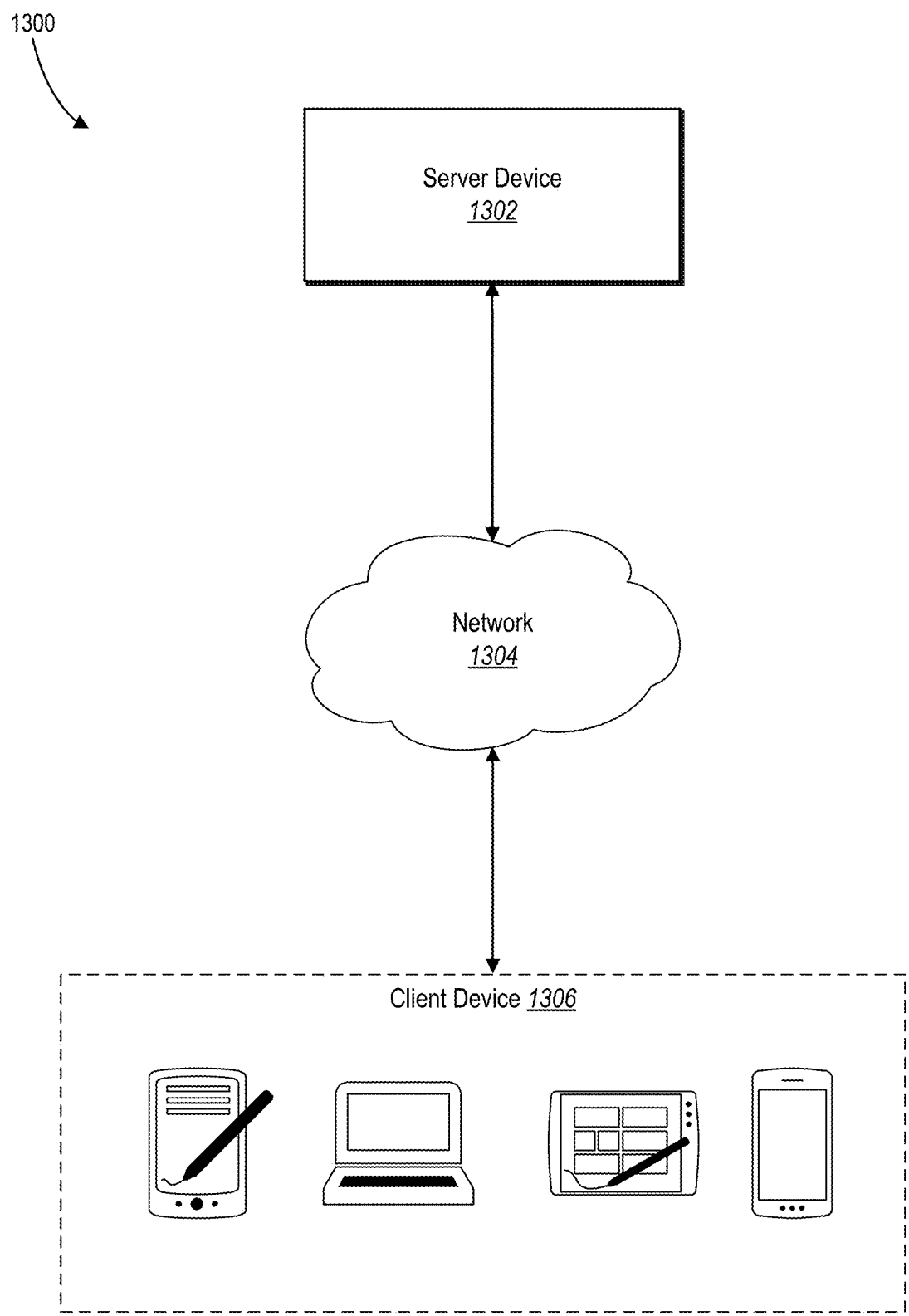
FIG. 13 illustrates a network environment of a digital survey system in accordance with one or more embodiments.

FIG. 13 illustrates an example network environment 1300 of the digital analytics system 104. Network environment 1300 includes a client device 1306, and a server device 1302 connected to each other by a network 1304. Although FIG. 13 illustrates a particular arrangement of client device 1306, server device 1302, and network 1304, this disclosure contemplates any suitable arrangement of client device 1306, server device 1302, and network 1304. As an example and not by way of limitation, two or more of the client devices 1306, and server devices 1302 may be connected to each other directly, bypassing network 1304. As another example, two or more of client devices 1306 and server devices 1302 may be physically or logically co-located with each other in whole, or in part. Moreover, although FIG. 13 illustrates a particular number of client devices 1306, server devices 1302, and networks 1304, this disclosure contemplates any suitable number of client devices 1306, server devices 1302, and networks 1304. As an example and not by way of limitation, network environment 1300 may include multiple client devices 1306, server devices 1302, and networks 1304.

This disclosure contemplates any suitable network 1304. As an example and not by way of limitation, one or more portions of network 1304 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1304 may include one or more networks 1304.

Links may connect client device 1306, and server device 1302 to network 1304 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network (SONET) or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1300. One or more first links may differ in one or more respects from one or more second links.

In particular embodiments, client device 1306 may be an electronic device including hardware, software, or embedded logic components or a combination of two or more such components and capable of carrying out the appropriate functionalities implemented or supported by client device 1306. As an example and not by way of limitation, a client device 1306 may include any of the computing devices discussed above in relation to FIG. 12. A client device 1306 may enable a network user at client device 1306 to access network 1304.

In particular embodiments, client device 1306 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 1306 may enter a Uniform Resource Locator ("URL") or other address directing the web browser to a particular server (such as server, or a server associated with a third-party system), and the web browser may generate a Hyper Text Transfer Protocol ("HTTP") request and communicate the HTTP request to server. The server may accept the HTTP request and communicate to client device 1306 one or more Hyper Text Markup Language ("HTML") files responsive to the HTTP request. Client device 1306 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 1302 may include a variety of servers, sub-systems, programs, modules, logs, and data stores. In particular embodiments, server device 1302 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1302 may also include suitable components such as network interfaces, security mechanisms, load balancers, failover servers, management-and-network-operations consoles, other suitable components, or any suitable combination thereof.

In particular embodiments, server device 1302 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., respondents 118a-118n, customers).

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A system comprising:
  at least one processor; and
  a non-transitory computer-readable medium comprising instructions that, when executed by the at least one processor, cause the system to:
    identify a set of touchpoints along an experience-journey timeline and an experience dataset indicating experiences of an entity captured in survey responses for the set of touchpoints, wherein the set of touchpoints comprise interactions corresponding to the entity with another entity;
    identify at least one of metadata or tags associating the survey responses from the experience dataset with touchpoints from the set of touchpoints;
    map the survey responses from the experience dataset to the touchpoints from the set of touchpoints based on at least one of the metadata or the tags;
    determine a set of experience indicators, wherein an experience indicator from the set of experience indicators represent combined experiences captured in a subset of survey responses of the survey responses in the experience dataset and comprise at least one of a representation of sentiments, emotions, or feedback;
    generate the experience-journey timeline comprising visual attributes representing particular experience indicators of combined experiences captured in the survey responses by mapping the particular experience indicators to particular touchpoints from the set of touchpoints along the experience-journey timeline; and
    provide the experience-journey timeline for display within a graphical user interface of a client device.

2. The system of claim 1, further comprising instructions that, when executed by the at least one processor, cause the system to provide the experience-journey timeline to cause the client device to display the particular experience indicators in connection with the particular touchpoints from the set of touchpoints within the graphical user interface.

3. The system of claim 1, wherein the experience-journey timeline indicates a first mapping between a first experience indicator corresponding to a first visual attribute and a first touchpoint and a second mapping between a second experience indicator corresponding to a second visual attribute and a second touchpoint.

4. The system of claim 3, further comprising instructions that, when executed by the at least one processor, cause the system to provide the experience-journey timeline to cause the client device to display:
  the first experience indicator in connection with the first touchpoint using the first visual attribute, wherein the first visual attribute comprises at least one of a color attribute, a shape attribute, or a size attribute; and
  the second experience indicator in connection with the second touchpoint using the second visual attribute, wherein the first visual attribute is visually different from the second visual attribute.

5. The system of claim 1, further comprising instructions that, when executed by the at least one processor, cause the system to provide the experience-journey timeline to cause the client device to:
  detect a user interaction with a selectable element corresponding to a touchpoint of the experience-journey timeline within the graphical user interface; and
  in response to detecting the user interaction:
    modify a visual appearance of a visual attribute representing an experience indicator in connection to the touchpoint of the experience-journey timeline within the graphical user interface; and
    display possible actions related to the touchpoint, entity-provided recommendations, entity information for the entity, or statistical evaluations for the touchpoint corresponding to the touchpoint of the experience-journey timeline within the graphical user interface.

6. The system of claim 1, further comprising instructions that, when executed by the at least one processor, cause the system to:
  generate the experience-journey timeline by generating the experience-journey timeline for a segment of users indicating mappings between user-segment-specific experience indicators representing particular survey responses that correspond to the segment of users and the particular touchpoints from the set of touchpoints; and
  provide the experience-journey timeline by providing the experience-journey timeline for the segment of users to cause the client device to display the user-segment-specific experience indicators corresponding to the segment of users in connection with the particular touchpoints from the set of touchpoints within the graphical user interface.

7. The system of claim 1, wherein:
  the experience indicator from the set of experience indicators represents combined sentiment, combined emotion, or combined feedback determined through a subset of survey responses from the experience dataset.

8. A non-transitory computer-readable medium storing instructions that, when executed by at least one processor, cause a computing system to:
identify a set of touchpoints along an experience-journey timeline and an experience dataset indicating experiences of an entity captured in survey responses for the set of touchpoints, wherein the set of touchpoints comprise interactions corresponding to the entity with another entity;
identify at least one of metadata or tags associating the survey responses from the experience dataset with touchpoints from the set of touchpoints;
map the survey responses from the experience dataset to the touchpoints from the set of touchpoints based on at least one of the metadata or the tags;
determine a set of experience indicators, wherein an experience indicator from the set of experience indicators represent combined experiences captured in a subset of survey responses of the survey responses in the experience dataset and comprise at least one of a representation of sentiments, emotions, or feedback;
generate the experience-journey timeline comprising visual attributes representing particular experience indicators of combined experiences captured in the survey responses by mapping the particular experience indicators to particular touchpoints from the set of touchpoints along the experience-journey timeline; and
provide the experience-journey timeline for display within a graphical user interface of a client device.

9. The non-transitory computer-readable medium of claim 8, further comprising instructions that, when executed by the at least one processor, cause the computing system to identify the set of touchpoints by identifying a subsequent touchpoint contingent upon an initial touchpoint being experienced by the entity before the subsequent touch point.

10. The non-transitory computer-readable medium of claim 8,
wherein the experience-journey timeline indicates a first mapping between a first experience indicator corresponding to a first visual attribute and a first touchpoint and a second mapping between a second experience indicator corresponding to a second visual attribute and a second touchpoint.

11. The non-transitory computer-readable medium of claim 10, further comprising instructions that, when executed by the at least one processor, cause the computing system to provide the experience-journey timeline to cause the client device to display:
the first experience indicator in connection with the first touchpoint using a first size attribute indicating a size of a group of individuals that experienced the first touchpoint; and
the second experience indicator in connection with the second touchpoint using a second size attribute indicating a different size of a different group of individuals that experienced the second touchpoint.

12. The non-transitory computer-readable medium of claim 10, further comprising instructions that, when executed by the at least one processor, cause the computing system to:
generate the experience-journey timeline for a segment of users indicating mappings between user-segment-specific experience indicators representing particular survey responses that correspond to the segment of users and the particular touchpoints from the set of touchpoints; and
provide the experience-journey timeline for the segment of users to cause the client device to display the user-segment-specific experience indicators corresponding to the segment of users in connection with the particular touchpoints from the set of touchpoints within the graphical user interface.

13. The non-transitory computer-readable medium of claim 10, further comprising instructions that, when executed by the at least one processor, cause the computing system to provide the experience-journey timeline to cause the client device to display a selectable option to send a digital survey corresponding to a touchpoint of the experience-journey timeline within the graphical user interface.

14. The non-transitory computer-readable medium of claim 13, further comprising instructions that, when executed by the at least one processor, cause the computing system to present distribution options to distribute a digital survey corresponding to the touchpoint to the entity in response to receiving an indication of a user interaction with the selectable option on the client device.

15. A computing device comprising:
at least one processor; and
a non-transitory computer-readable medium comprising instructions that, when executed by the at least one processor, cause the computing device to:
detect a user selection of an entity within a graphical user interface;
in response to detecting the user selection of the entity, receive an experience-journey timeline that:
comprises visual attributes representing particular experience indicators from a set of experience indicators that represent combined experiences in an experience dataset captured in survey responses for a set of touchpoints and wherein the particular experience indicators comprise at least one of a representation of sentiments, emotions, or feedback; and
indicates mappings between the particular experience indicators to particular touchpoints from the set of touchpoints along the experience-journey timeline based on at least one of metadata or tags associating an experience dataset with the set of touchpoints, wherein the mappings are determined using mappings between the survey responses from the experience dataset and touchpoints from the set of touchpoints based on at least one of the metadata or the tags and the set of touchpoints comprise interactions corresponding to the entity with another entity; and
display the experience-journey timeline within the graphical user interface by displaying the particular experience indicators in connection with the particular touchpoints from the set of touchpoints.

16. The computing device of claim 15, further comprising instructions that, when executed by the at least one processor, cause the computing device to display the experience-journey timeline within the graphical user interface by:
displaying a first experience indicator in connection with a first touchpoint using a first visual attribute, wherein the first visual attribute comprises at least one of a color attribute, a shape attribute, or a size attribute; and
displaying a second experience indicator in connection with a second touchpoint using a second visual attribute, wherein the first visual attribute is visually different from the second visual attribute.

17. The computing device of claim 15, further comprising instructions that, when executed by the at least one processor, cause the computing device to:
   detect a user interaction with a selectable element corresponding to a touchpoint of the experience-journey timeline within the graphical user interface; and
   in response to detecting the user interaction with the selectable element:
      modify a visual appearance of a visual attribute corresponding to an experience indicator in connection to the touchpoint of the experience-journey timeline within the graphical user interface; and
      display possible actions related to at least one of the touchpoints, entity-provided recommendations, entity information for the entity, or statistical evaluations for the touchpoint corresponding to the touchpoint of the experience-journey timeline within the graphical user interface.

18. The computing device of claim 15, further comprising instructions that, when executed by the at least one processor, cause the computing device to:
   display a selectable option to send a digital survey corresponding to a touchpoint of the experience-journey timeline within the graphical user interface;
   detect a user interaction with the selectable option; and
   based on detecting the user interaction, present distribution options for distributing a digital survey corresponding to the touchpoint to the entity.

19. The computing device of claim 15, further comprising instructions that, when executed by the at least one processor, cause the computing device to:
   detect a user selection of a segment of users within the graphical user interface;
   based on detecting the user selection of the segment of users, receive data for an experience-journey timeline for the segment of users, wherein the experience-journey timeline for the segment of users indicates mappings between user-segment-specific experience indicators representing particular survey responses that correspond to the segment of users and the particular touchpoints from the set of touchpoints; and
   display the experience-journey timeline within the graphical user interface by displaying the user-segment-specific experience indicators corresponding to the segment of users in connection with the particular touchpoints from the set of touchpoints.

20. The computing device of claim 15, wherein an experience indicator from the set of experience indicators represents a combined sentiment, combined emotion, or combined feedback determined through natural language processing of a subset of survey responses from the experience dataset.

* * * * *